United States Patent
Budiman et al.

(10) Patent No.: US 12,551,105 B2
(45) Date of Patent: Feb. 17, 2026

(54) SYSTEMS, DEVICES, AND METHODS FOR IMPROVED ANALYTE SENSOR ACCURACY AND FAULT DETECTION

(71) Applicant: ABBOTT DIABETES CARE INC., Alameda, CA (US)

(72) Inventors: Erwin S. Budiman, Fremont, CA (US); Yi Wang, San Ramon, CA (US); Benjamin Jay Feldman, Berkeley, CA (US); Hyun Cho, Berkeley, CA (US); Kuan-Chou Chen, Fremont, CA (US); Lam N. Tran, Dublin, CA (US); Stephen Oja, Oakland, CA (US); Tianmei Ouyang, Fremont, CA (US)

(73) Assignee: ABBOTT DIABETES CARE INC., Alameda, CA (US)

(*) Notice: Subject to any disclaimer, the term of this patent is extended or adjusted under 35 U.S.C. 154(b) by 495 days.

(21) Appl. No.: 17/928,794

(22) PCT Filed: Jun. 7, 2021

(86) PCT No.: PCT/US2021/036094
§ 371 (c)(1),
(2) Date: Nov. 30, 2022

(87) PCT Pub. No.: WO2021/252317
PCT Pub. Date: Dec. 16, 2021

(65) Prior Publication Data
US 2023/0225615 A1    Jul. 20, 2023

Related U.S. Application Data

(60) Provisional application No. 63/036,194, filed on Jun. 8, 2020.

(51) Int. Cl.
*A61B 5/00*  (2006.01)
*A61B 5/145*  (2006.01)

(52) U.S. Cl.
CPC .......... *A61B 5/0022* (2013.01); *A61B 5/145* (2013.01); *A61B 5/6833* (2013.01)

(58) Field of Classification Search
CPC ..... A61B 5/0022; A61B 5/145; A61B 5/6833; A61B 5/7203; A61B 5/14865;
(Continued)

(56) References Cited

U.S. PATENT DOCUMENTS

| 6,893,552 B1 | 5/2005 | Wang et al. |
| 8,185,181 B2 * | 5/2012 | Feldman ............... A61B 5/01 600/365 |

(Continued)

FOREIGN PATENT DOCUMENTS

| GB | 2 539 224 A | 12/2016 |
| WO | WO 2017/044654 A1 | 3/2017 |

(Continued)

OTHER PUBLICATIONS

JP, 2022-570303 First Office Action, Mar. 5, 2025.
(Continued)

*Primary Examiner* — Jonathan T Kuo
(74) *Attorney, Agent, or Firm* — ONE LLP

(57) ABSTRACT

Various embodiments of systems, devices and methods for improving the accuracy of an analyte sensor and for detecting sensor fault conditions are disclosed. According to some embodiments, these systems, devices, and methods can utilize a first data collected by a glucose sensor and a second data collected by a secondary sensing element. In some embodiments, the secondary sensing element can be one of a lactate sensing element, a ketone sensing element, or a heart rate monitor, among others.

40 Claims, 16 Drawing Sheets

(58) Field of Classification Search
CPC ..... A61B 5/318; A61B 5/369; A61B 5/14503; A61B 5/14532; A61B 5/14546
See application file for complete search history.

(56) References Cited

U.S. PATENT DOCUMENTS

| | | | |
|---|---|---|---|
| 9,907,492 B2* | 3/2018 | Budiman | A61B 5/14532 |
| 9,913,599 B2* | 3/2018 | Bernstein | G16H 20/00 |
| 2008/0009692 A1 | 1/2008 | Stafford | |
| 2008/0153118 A1 | 6/2008 | Quarder et al. | |
| 2011/0105873 A1* | 5/2011 | Feldman | A61B 5/746 |
| | | | 600/365 |
| 2011/0193704 A1 | 8/2011 | Harper et al. | |
| 2011/0213225 A1 | 9/2011 | Bernstein et al. | |
| 2011/0319729 A1 | 12/2011 | Donnay et al. | |
| 2014/0088393 A1* | 3/2014 | Bernstein | G16H 80/00 |
| | | | 600/365 |
| 2015/0018639 A1 | 1/2015 | Stafford | |
| 2015/0025345 A1 | 1/2015 | Funderburk et al. | |
| 2015/0173661 A1 | 6/2015 | Myles | |
| 2015/0216456 A1* | 8/2015 | Budiman | A61B 5/14546 |
| | | | 600/309 |
| 2019/0246962 A1 | 8/2019 | Shah et al. | |
| 2019/0320947 A1 | 10/2019 | Chen et al. | |

FOREIGN PATENT DOCUMENTS

| | | |
|---|---|---|
| WO | WO 2017/196576 A1 | 11/2017 |
| WO | WO 2019/126397 A1 | 6/2019 |

OTHER PUBLICATIONS

WO, PCT/US2021/036094 ISR and Written Opinion, Nov. 18, 2021.
EP, 21742566.9 Examination Report, Jun. 16, 2025.
202180041070.X First Office Action.

* cited by examiner

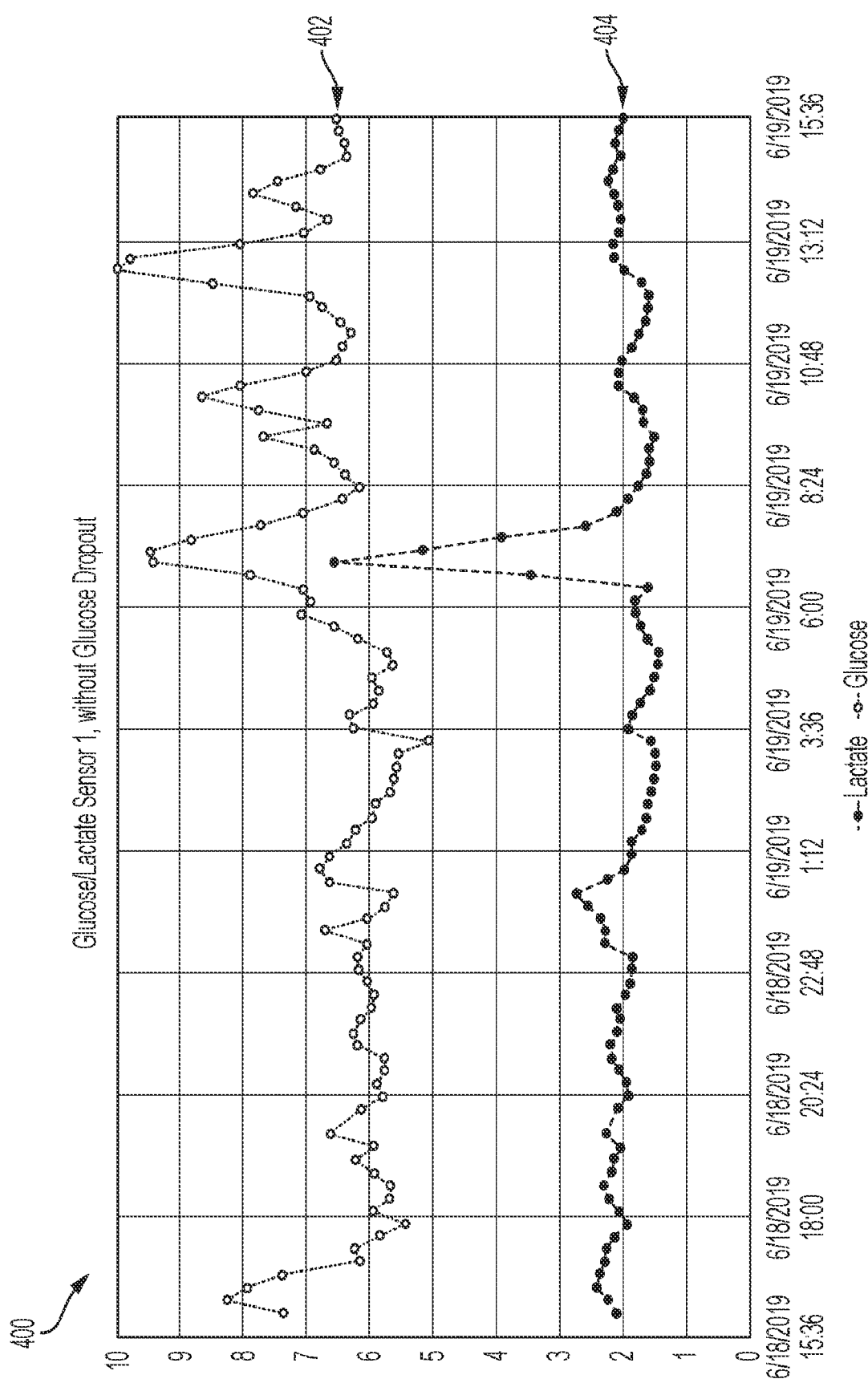

SYSTEMS, DEVICES, AND METHODS FOR IMPROVED ANALYTE SENSOR ACCURACY AND FAULT DETECTION

CROSS-REFERENCE TO PATENT APPLICATIONS

The present application is a national phase entry under 35 U.S.C. § 371 of PCT Application No. PCT/US21/36094, filed Jun. 7, 2021, which claims priority to U.S. Provisional Patent Application No. 63/036,194, filed Jun. 8, 2020, both of which are incorporated herein by reference in their entireties for all purposes.

FIELD

The subject matter described herein relates generally to systems, devices, and methods for improving the accuracy and fault detection of an analyte sensor. In particular, the embodiments described herein involve corroborating data collected by a glucose sensor with data collected from a secondary sensing element, in order to correct a glucose level or to detect a suspected adverse condition, such as a suspected sensor fault.

BACKGROUND

A vast and growing market exists for monitoring the health and condition of humans and other living animals. Information that describes the physical or physiological condition of humans can be used in countless ways to assist and improve quality of life, and diagnose and treat undesirable human conditions.

A common device used to collect such information is a physiological sensor such as a biochemical analyte sensor, or a device capable of sensing a chemical analyte of a biological entity. Biochemical sensors come in many forms and can be used to sense analytes in fluids, tissues, or gases forming part of, or produced by, a biological entity, such as a human being. These analyte sensors can be used on or within the body itself, such as in the case of a transcutaneously implanted analyte sensor, or they can be used on biological substances that have already been removed from the body.

Although analyte sensors and analyte monitoring systems often have a complex and well-studied design, they can still be subject to a loss of function prior to the end of their expected life. This can result in an undesirable and unexpected reduction in sensor signal response to actual analyte fluctuations. In many cases, the reduction in signal response of an analyte sensor can cause a false indication of a low analyte level or, in the case of a complete sensor fault, a failure to indicate any analyte level whatsoever. Furthermore, an undesirable and unexpected reduction in signal response of an analyte sensor can trigger false positives with respect to low-threshold alarms, such as low-glucose or hypoglycemia alarms.

Another problem that can occur with analyte monitoring systems are "night time glucose dropouts," a phenomenon that results in a sudden decrease in a blood glucose level for a short period of time at night while a human wearing an analyte sensor is sleeping. These drops in blood glucose levels can trigger false positives with respect to low-threshold alarms or make unnecessary insulin adjustments when the sensor is used with an automated insulin delivery system.

For these and other reasons, needs exist for improving the accuracy of analyte sensors, as well as detecting sensor fault conditions.

SUMMARY

Example embodiments of systems, devices, and methods are described herein for improving the accuracy of an analyte sensor and for detecting sensor fault conditions. Some embodiments, for example, provide for the detection of suspected glucose dropouts and/or the correction of glucose levels based on glucose level and lactate level measurements and calculations. In some embodiments, a corrective action, such as a lag correction, glucose sensor termination, or glucose sensor data smoothing, can be performed based on a first data indicative of a glucose level and a second data indicative of a secondary physiological measurement, wherein the secondary physiological measurement can comprise, for example, a ketone level or a heart rate measurement. Numerous examples of algorithms and methods for performing combinations and/or variations of one or both of these detection and correction mechanisms are provided, as well as example embodiments of systems and devices for performing the same.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 4A and 4B are multi-plot graphs depicting example sensor signals over time.

DETAILED DESCRIPTION

Figure 1:
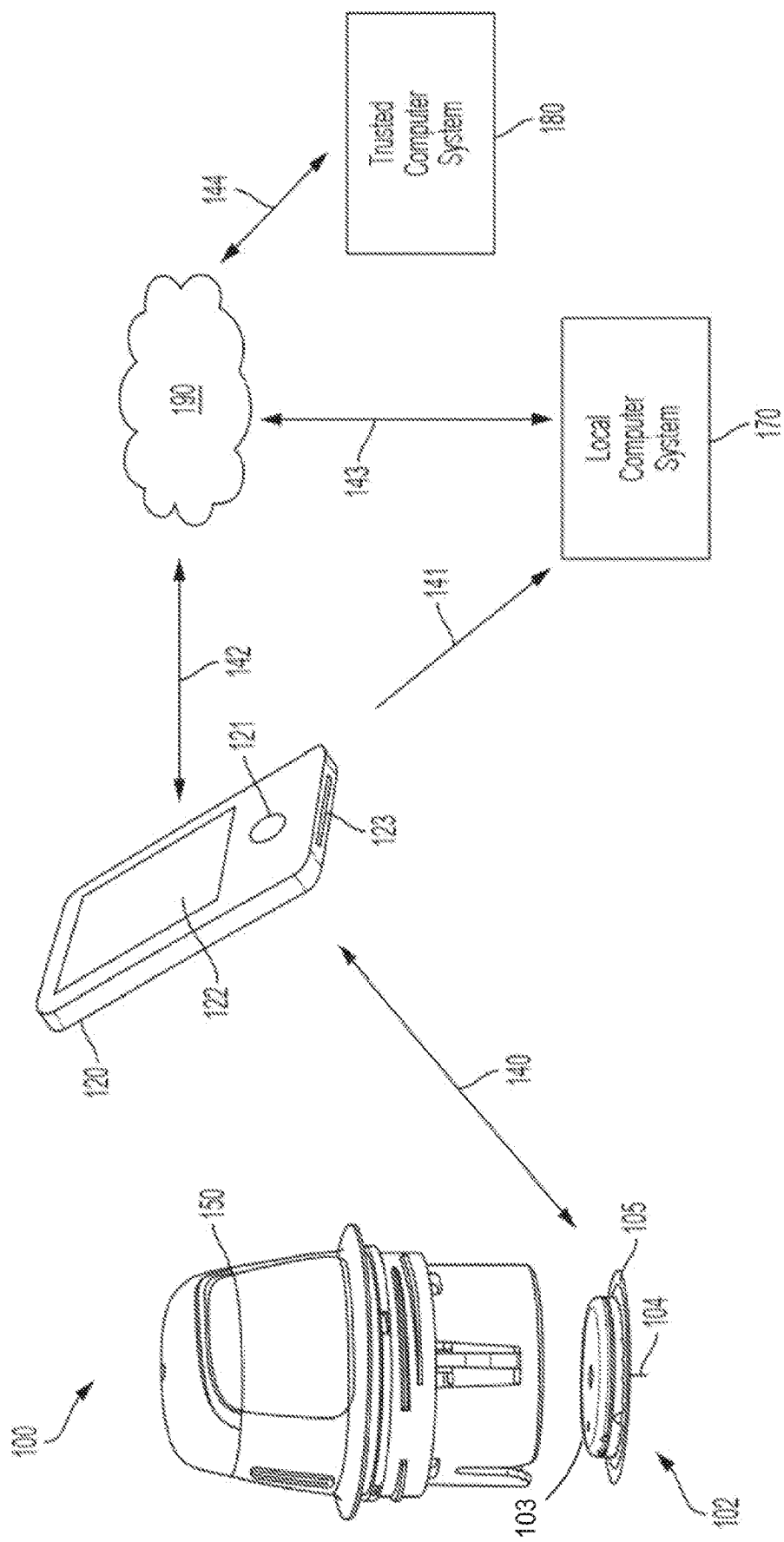
FIG. 1 is an illustrative view depicting an example embodiment of an in vivo analyte monitoring system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The publications discussed herein are provided solely for their disclosure prior to the filing date of the present application. Nothing herein is to be construed as an admission that the present disclosure is not entitled to antedate such publications by virtue of prior disclosure. Furthermore, the dates of publication provided may be different from the actual publication dates which may need to be independently confirmed.

Generally, embodiments of the present disclosure are used with systems, devices, and methods for detecting at least one analyte, such as glucose, in a bodily fluid (e.g., subcutaneously within the interstitial fluid ("ISF") or blood, within the dermal fluid of the dermal layer, or otherwise). Accordingly, many embodiments include in vivo analyte sensors structurally configured so that at least a portion of the sensor is, or can be, positioned in the body of a user to obtain information about at least one analyte of the body. However, the embodiments disclosed herein can be used with in vivo analyte monitoring systems that incorporate in vitro capability, as well as purely in vitro or ex vivo analyte monitoring systems, including those systems that are entirely non-invasive.

Furthermore, for each and every embodiment of a method disclosed herein, systems and devices capable of performing each of those embodiments are covered within the scope of the present disclosure. For example, embodiments of sensor control devices are disclosed and these devices can have one or more sensors, analyte monitoring circuitry (e.g., an analog circuit), non-transitory memories (e.g., for storing instructions), power sources, communication circuitry, transmitters, receivers, processing circuitry, and/or controllers (e.g., for executing instructions) that can perform any and all method steps or facilitate the execution of any and all method steps. These sensor control device embodiments can be used and can be capable of use to implement those steps performed by a sensor control device from any and all of the methods described herein.

Likewise, embodiments of reader devices are disclosed having one or more transmitters, receivers, non-transitory memories (e.g., for storing instructions), power sources, processing circuitry, and/or controllers (e.g., for executing instructions) that can perform any and all method steps or facilitate the execution of any and all method steps. These embodiments of the reader devices can be used to implement those steps performed by a reader device from any and all of the methods described herein.

Embodiments of trusted computer systems are also disclosed. These trusted computer systems can include one or more processing circuitry, controllers, transmitters, receivers, non-transitory memories, databases, servers, and/or networks, and can be discretely located or distributed across multiple geographic locales. These embodiments of the trusted computer systems can be used to implement those steps performed by a trusted computer system from any and all of the methods described herein.

Various embodiments of systems, devices and methods for improving the accuracy of an analyte sensor and for detecting sensor fault conditions are disclosed. According to some embodiments, these systems, devices, and methods can utilize a first data collected by a glucose sensor and a second data collected by a secondary sensing element. In some embodiments, the secondary sensing element can be one of a lactate sensing element, a ketone sensing element, or a heart rate monitor, among others.

A number of embodiments of the present disclosure are designed to improve upon the computer-implemented capabilities of analyte monitoring systems with respect to, for example, the detection of nighttime glucose dropouts, the correction of glucose level measurements, and the early termination of glucose sensors, to name only a few. More specifically, these embodiments can utilize "secondary" data indicative of non-glucose physiological measurements (e.g., lactate levels, ketone levels, heart rate measurements, etc.) to improve upon the accuracy of in vivo glucose sensors, as well as to determine conditions in which an in vivo glucose sensor can or should be terminated or temporarily masked. Accordingly, the embodiments disclosed herein reflect improvements over prior methods and are directed to systems, devices, and methods that can improve upon the accuracy of analyte monitoring systems by utilizing glucose sensor data combined with non-glucose physiological measurements in a specific and non-conventional way. Other features and advantages of the disclosed embodiments are further discussed below.

Before describing the embodiments in detail, however, it is first desirable to describe examples of devices that can be present within, for example, an in vivo analyte monitoring system, as well as examples of their operation, all of which can be used with the embodiments described herein.

Example Embodiments of Analyte Monitoring Systems

There are various types of analyte monitoring systems. "Continuous Analyte Monitoring" systems (or "Continuous Glucose Monitoring" systems), for example, are in vivo systems that can transmit data from a sensor control device to a reader device repeatedly or continuously without prompting, e.g., automatically according to a schedule. "Flash Analyte Monitoring" systems (or "Flash Glucose Monitoring" systems or simply "Flash" systems), as another example, are in vivo systems that can transfer data from a sensor control device in response to a scan or request for data by a reader device, such as with a Near Field Communication (NFC) or Radio Frequency Identification (RFID) protocol. In vivo analyte monitoring systems can also operate without the need for finger stick calibration.

In vivo monitoring systems can include a sensor that, while positioned in vivo, makes contact with the bodily fluid of the user and senses one or more analyte levels contained therein. The sensor can be part of a sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few. As used herein, these terms are not limited to devices with analyte sensors, and encompass devices that have sensors of other types, whether biometric or non-biometric. The term "on body" refers to any device that resides directly on the body or in close proximity to the body, such as a wearable device (e.g., glasses, watch, wristband or bracelet, neckband or necklace, etc.).

In vivo monitoring systems can also include one or more reader devices that receive sensed analyte data from the sensor control device. These reader devices can process and/or display the sensed analyte data, or sensor data, in any number of forms, to the user. These devices, and variations thereof, can be referred to as "handheld reader devices," "reader devices" (or simply, "readers"), "handheld electronics" (or handhelds), "portable data processing" devices or units, "data receivers," "receiver" devices or units (or simply receivers), "relay" devices or units, or "remote" devices or units, to name a few. Other devices such as personal computers have also been utilized with or incorporated into in vivo and in vitro monitoring systems.

In vivo analyte monitoring systems can be differentiated from "in vitro" systems that contact a biological sample outside of the body (or rather "ex vivo") and that typically include a meter device that has a port for receiving an analyte test strip carrying a bodily fluid of the user, which can be analyzed to determine the user's analyte level. As mentioned, the embodiments described herein can be used with in vivo systems, in vitro systems, and combinations thereof.

The embodiments described herein can be used to monitor and/or process information regarding any number of one or more different analytes. Analytes that may be monitored include, but are not limited to, acetyl choline, amylase, bilirubin, cholesterol, chorionic gonadotropin, glycosylated hemoglobin (HbA1c), creatine kinase (e.g., CK-MB), creatine, creatinine, DNA, fructosamine, glucose, glucose derivatives, glutamine, growth hormones, hormones, ketones, ketone bodies, lactate, peroxide, prostate-specific antigen, prothrombin, RNA, thyroid stimulating hormone, and troponin. The concentration of drugs, such as, for example, antibiotics (e.g., gentamicin, vancomycin, and the like), digitoxin, digoxin, drugs of abuse, theophylline, and warfarin, may also be monitored. In embodiments that monitor more than one analyte, the analytes may be monitored at the same or different times.

FIG. 1 is an illustrative view depicting an example embodiment of an in vivo analyte monitoring system 100 having a sensor control device 102 and a reader device 120 that communicate with each other over a local communication path (or link) 140, which can be wired or wireless, and uni-directional or bi-directional. In embodiments where path 140 is wireless, a near field communication (NFC) protocol, RFID protocol, Bluetooth or Bluetooth Low Energy protocol, Wi-Fi protocol, proprietary protocol, or the like can be used, including those communication protocols in existence as of the date of this filing or their later developed variants.

Reader device 120 is also capable of wired, wireless, or combined communication with a computer system 170 (e.g., a local or remote computer system) over communication path (or link) 141 and with a network 190, such as the internet or the cloud, over communication path (or link) 142. Communication with network 190 can involve communication with trusted computer system 180 within network 190, or though network 190 to computer system 170 via communication link (or path) 143. Communication paths 141, 142, and 143 can be wireless, wired, or both, can be uni-directional or bi-directional, and can be part of a telecommunications network, such as a Wi-Fi network, a local area network (LAN), a wide area network (WAN), the internet, or other data network. In some cases, communication paths 141 and 142 can be the same path. All communications over paths 140, 141, and 142 can be encrypted and sensor control device 102, reader device 120, computer system 170, and trusted computer system 180 can each be configured to encrypt and decrypt those communications sent and received.

Variants of devices 102 and 120, as well as other components of an in vivo-based analyte monitoring system that are suitable for use with the system, device, and method embodiments set forth herein, are described in U.S. Patent Publication No. 2011/0213225 (the '225 Publication), which is incorporated by reference herein in its entirety for all purposes.

Sensor control device 102 can include a housing 103 containing in vivo analyte monitoring circuitry and a power source. In this embodiment, the in vivo analyte monitoring circuitry is electrically coupled with one or more analyte sensors 104 that extend through an adhesive patch 105 and projects away from housing 103. Adhesive patch 105 contains an adhesive layer (not shown) for attachment to a skin surface of the body of the user. Other forms of body attachment to the body may be used, in addition to or instead of adhesive.

Sensor 104 is adapted to be at least partially inserted into the body of the user, where it can make fluid contact with that user's bodily fluid (e.g., subcutaneous (subdermal) fluid, dermal fluid, or blood) and be used, along with the in vivo analyte monitoring circuitry, to measure analyte-related data of the user. Sensor 104 and any accompanying sensor control electronics can be applied to the body in any desired manner. For example, an insertion device 150 can be used to position all or a portion of analyte sensor 104 through an external surface of the user's skin and into contact with the user's bodily fluid. In doing so, the insertion device can also position sensor control device 102 with adhesive patch 105 onto the skin. In other embodiments, insertion device can position sensor 104 first, and then accompanying sensor control electronics can be coupled with sensor 104 afterwards, either manually or with the aid of a mechanical device. Examples of insertion devices are described in U.S. Publication Nos. 2008/0009692, 2011/0319729, 2015/0018639, 2015/0025345, and 2015/0173661, all which are incorporated by reference herein in their entireties and for all purposes.

After collecting raw data from the user's body, sensor control device 102 can apply analog signal conditioning to the data and convert the data into a digital form of the conditioned raw data. In some embodiments, sensor control device 102 can then algorithmically process the digital raw data into a form that is representative of the user's measured biometric (e.g., analyte level) and/or one or more analyte metrics based thereupon. For example, sensor control device 102 can include processing circuitry to algorithmically perform any of the method steps described herein, such as, for example, to correct a glucose level measurement, to detect a suspected glucose dropout, or to detect a suspected sensor fault condition, to name only a few. Sensor control device 102 can then encode and wirelessly communicate data indicative of a glucose level, indications of sensor fault and/or processed sensor data to reader device 120, which in turn can format or graphically process the received data for digital display to the user. In other embodiments, in addition to, or in lieu of, wirelessly communicating sensor data to another device (e.g., reader device 120), sensor control device 102 can graphically process the final form of the data such that it is ready for display, and display that data on a display of sensor control device 102. In some embodiments, the final form of the biometric data (prior to graphic processing) is used by the system (e.g., incorporated into a diabetes monitoring regime) without processing for display to the user.

In still other embodiments, the conditioned raw digital data can be encoded for transmission to another device, e.g., reader device 120, which then algorithmically processes that digital raw data into a form representative of the user's measured biometric (e.g., a form readily made suitable for display to the user) and/or one or more analyte metrics based thereupon. Reader device 120 can include processing circuitry to algorithmically perform any of the method steps described herein such as, for example, to correct a glucose level measurement, to detect a suspected glucose dropout, or to detect a suspected sensor fault condition, to name only a few. This algorithmically processed data can then be formatted or graphically processed for digital display to the user.

In other embodiments, sensor control device 102 and reader device 120 transmit the digital raw data to another computer system for algorithmic processing and display.

Reader device 120 can include a display 122 to output information to the user and/or to accept an input from the user, and an optional input component 121 (or more), such as a button, actuator, touch sensitive switch, capacitive switch, pressure sensitive switch, jog wheel or the like, to input data, commands, or otherwise control the operation of reader device 120. In certain embodiments, display 122 and input component 121 may be integrated into a single component, for example, where the display can detect the presence and location of a physical contact touch upon the display, such as a touch screen user interface. In certain embodiments, input component 121 of reader device 120 may include a microphone and reader device 120 may include software configured to analyze audio input received from the microphone, such that functions and operation of the reader device 120 may be controlled by voice commands. In certain embodiments, an output component of reader device 120 includes a speaker (not shown) for outputting information as audible signals. Similar voice responsive components such as a speaker, microphone and software routines to generate, process and store voice driven signals may be included in sensor control device 102.

Reader device 120 can also include one or more data communication ports 123 for wired data communication with external devices such as computer system 170 or sensor control device 102. Example data communication ports include USB ports, mini USB ports, USB Type-C ports, USB micro-A and/or micro-B ports, RS-232 ports, Ethernet ports, Firewire ports, or other similar data communication ports configured to connect to the compatible data cables. Reader device 120 may also include an integrated or attachable in vitro glucose meter, including an in vitro test strip port (not shown) to receive an in vitro glucose test strip for performing in vitro blood glucose measurements.

Reader device 120 can display the measured biometric data wirelessly received from sensor control device 102 and can also be configured to output alarms, alert notifications, glucose values, etc., which may be visual, audible, tactile, or any combination thereof. Further details and other display embodiments can be found in, e.g., U.S. Publication No. 2011/0193704, which is incorporated herein by reference in its entirety for all purposes.

Reader device 120 can function as a data conduit to transfer the measured data and/or analyte metrics from sensor control device 102 to computer system 170 or trusted computer system 180. In certain embodiments, the data received from sensor control device 102 may be stored (permanently or temporarily) in one or more memories of reader device 120 prior to uploading to system 170, 180 or network 190.

Computer system 170 may be a personal computer, a server terminal, a laptop computer, a tablet, or other suitable data processing device. Computer system 170 can be (or include) software for data management and analysis and communication with the components in analyte monitoring system 100. Computer system 170 can be used by the user or a medical professional to display and/or analyze the biometric data measured by sensor control device 102. In some embodiments, sensor control device 102 can communicate the biometric data directly to computer system 170 without an intermediary such as reader device 120, or indirectly using an internet connection (also optionally without first sending to reader device 120). Operation and use of computer system 170 is further described in the '225 Publication incorporated herein. Analyte monitoring system 100 can also be configured to operate with a data processing module (not shown), also as described in the incorporated '225 Publication.

Trusted computer system 180 can be within the possession of the manufacturer or distributor of sensor control device 102, either physically or virtually through a secured connection, and can be used to perform authentication of sensor control device 102, for secure storage of the user's biometric data, and/or as a server that serves a data analytics program (e.g., accessible via a web browser) for performing analysis on the user's measured data.

Example Embodiments of Reader Devices

Reader device 120 can be a mobile communication device such as a dedicated reader device (configured for communication with a sensor control device 102, and optionally a computer system 170, but without mobile telephony communication capability) or a mobile telephone including, but not limited to, a Wi-Fi or internet enabled smart phone, tablet, or personal digital assistant (PDA). Examples of smart phones can include those mobile phones based on a Windows® operating system, Android™ operating system, iPhone® operating system, Palm® WebOS™, Blackberry® operating system, or Symbian® operating system, with data network connectivity functionality for data communication over an internet connection and/or a local area network (LAN).

Reader device 120 can also be configured as a mobile smart wearable electronics assembly, such as an optical assembly that is worn over or adjacent to the user's eye (e.g., a smart glass or smart glasses, such as Google glasses, which is a mobile communication device). This optical assembly can have a transparent display that displays information about the user's analyte level (as described herein) to the user while at the same time allowing the user to see through the display such that the user's overall vision is minimally obstructed. The optical assembly may be capable of wireless communications similar to a smart phone. Other examples of wearable electronics include devices that are worn around or in the proximity of the user's wrist (e.g., a watch, etc.), neck (e.g., a necklace, etc.), head (e.g., a headband, hat, etc.), chest, or the like.

Figure 2:
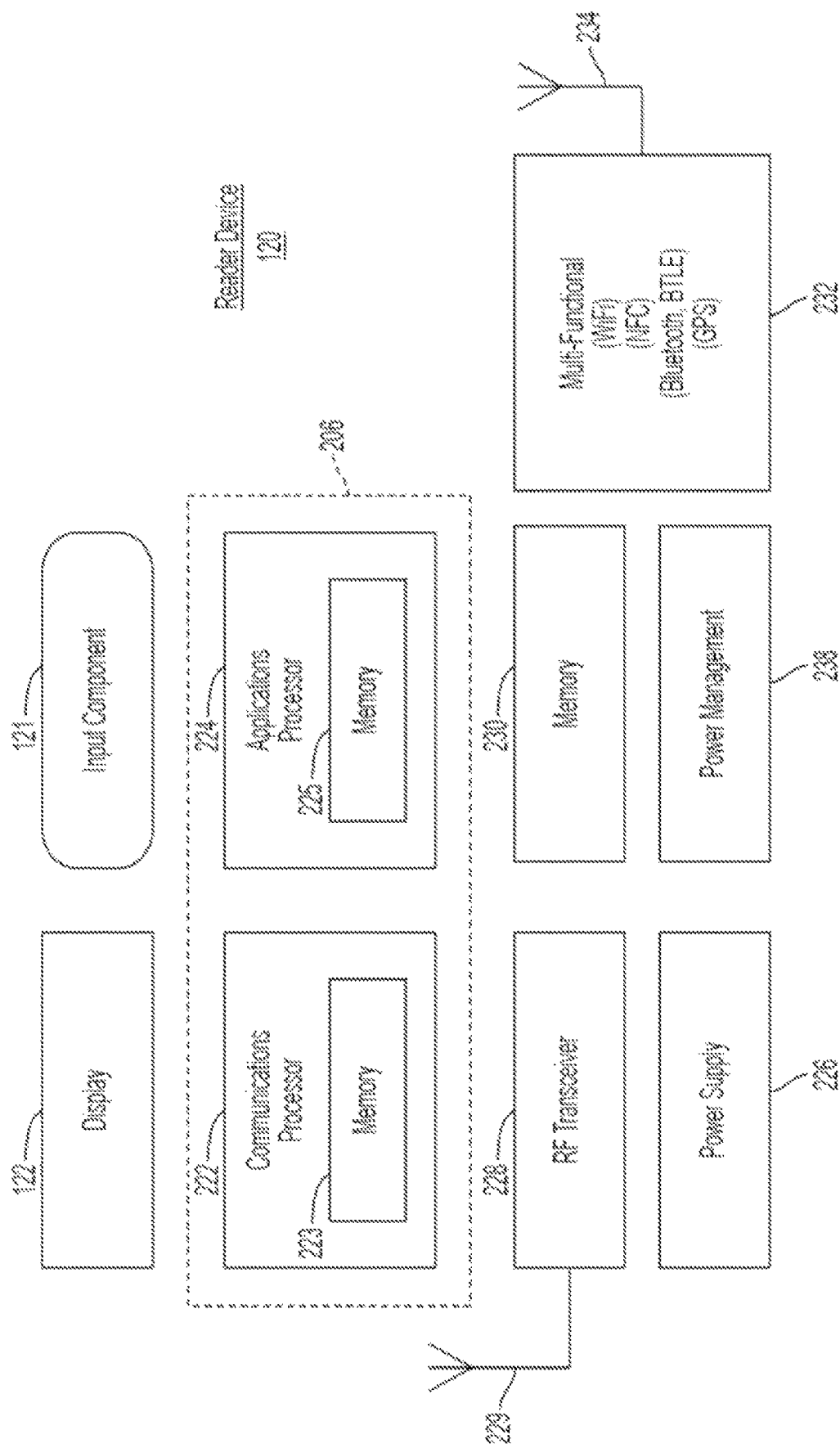
FIG. 2 is a block diagram of an example embodiment of a reader device.

FIG. 2 is a block diagram of an example embodiment of a reader device 120 configured as a smart phone. Here, reader device 120 includes an input component 121, display 122, and processing circuitry 206, which can include one or more processors, microprocessors, controllers, and/or microcontrollers, each of which can be a discrete chip or distributed amongst (and a portion of) a number of different chips. Here, processing circuitry 206 includes a communications processor 222 having on-board memory 223 and an applications processor 224 having on-board memory 225. Reader device 120 further includes RF communication circuitry 228 coupled with an RF antenna 229, a memory 230, multi-functional circuitry 232 with one or more associated antennas 234, a power supply 226, power management circuitry 238, and a clock (not shown). FIG. 2 is an abbreviated representation of the typical hardware and functionality that resides within a smart phone and those of ordinary skill in the art will readily recognize that other hardware and functionality (e.g., codecs, drivers, glue logic) can also be included.

Communications processor 222 can interface with RF communication circuitry 228 and perform analog-to-digital conversions, encoding and decoding, digital signal processing and other functions that facilitate the conversion of voice, video, and data signals into a format (e.g., in-phase and quadrature) suitable for provision to RF communication circuitry 228, which can then transmit the signals wirelessly. Communications processor 222 can also interface with RF communication circuitry 228 to perform the reverse functions necessary to receive a wireless transmission and convert it into digital data, voice, and video. RF communication circuitry 228 can include a transmitter and a receiver (e.g., integrated as a transceiver) and associated encoder logic.

Applications processor 224 can be adapted to execute the operating system and any software applications that reside on reader device 120, process video and graphics, and perform those other functions not related to the processing of communications transmitted and received over RF antenna 229. The smart phone operating system will operate in conjunction with a number of applications on reader device 120. Any number of applications (also known as "user interface applications") can be running on reader device 120 at any one time, and may include one or more applications that are related to a diabetes monitoring regime, in addition to the other commonly used applications that are unrelated to such a regime, e.g., email, calendar, weather, sports, games, etc. For example, the data indicative of a sensed analyte level and in vitro blood analyte measurements received by the reader device can be securely communicated to user interface applications residing in memory 230 of reader device 120. Such communications can be securely performed, for example, through the use of mobile application containerization or wrapping technologies.

Memory 230 can be shared by one or more of the various functional units present within reader device 120, or can be distributed amongst two or more of them (e.g., as separate memories present within different chips). Memory 230 can also be a separate chip of its own. Memories 223, 225, and 230 are non-transitory, and can be volatile (e.g., RAM, etc.) and/or non-volatile memory (e.g., ROM, flash memory, F-RAM, etc.).

Multi-functional circuitry 232 can be implemented as one or more chips and/or components (e.g., transmitter, receiver, transceiver, and/or other communication circuitry) that perform other functions such as local wireless communications, e.g., with sensor control device 102 under the appropriate protocol (e.g., Wi-Fi, Bluetooth, Bluetooth Low Energy, Near Field Communication (NFC), Radio Frequency Identification (RFID), proprietary protocols, and others) and determining the geographic position of reader device 120 (e.g., global positioning system (GPS) hardware). One or more other antennas 234 are associated with the functional circuitry 232 as needed to operate with the various protocols and circuits.

Power supply 226 can include one or more batteries, which can be rechargeable or single-use disposable batteries. Power management circuitry 238 can regulate battery charging and power supply monitoring, boost power, perform DC conversions, and the like.

Reader device 120 can also include or be integrated with a drug (e.g., insulin, etc.) delivery device such that they, e.g., share a common housing. Examples of such drug delivery devices can include medication pumps having a cannula that remains in the body to allow infusion over a multi-hour or multi-day period (e.g., wearable pumps for the delivery of basal and bolus insulin). Reader device 120, when combined with a medication pump, can include a reservoir to store the drug, a pump connectable to transfer tubing, and an infusion cannula. The pump can force the drug from the reservoir, through the tubing and into the diabetic's body by way of the cannula inserted therein. Other examples of drug delivery devices that can be included with (or integrated with) reader device 120 include portable injection devices that pierce the skin only for each delivery and are subsequently removed (e.g., insulin pens). A reader device 120, when combined with a portable injection device, can include an injection needle, a cartridge for carrying the drug, an interface for controlling the amount of drug to be delivered, and an actuator to cause injection to occur. The device can be used repeatedly until the drug is exhausted, at which point the combined device can be discarded, or the cartridge can be replaced with a new one, at which point the combined device can be reused repeatedly. The needle can be replaced after each injection.

The combined device can function as part of a closed-loop system (e.g., an artificial pancreas system requiring no user intervention to operate) or semi-closed loop system (e.g., an insulin loop system requiring seldom user intervention to operate, such as to confirm changes in dose). For example, the diabetic's analyte level can be monitored in a repeated automatic fashion by sensor control device 102, which can then communicate that monitored analyte level to reader device 120, and the appropriate drug dosage to control the diabetic's analyte level can be automatically determined and subsequently delivered to the diabetic's body. Software instructions for controlling the pump and the amount of insulin delivered can be stored in the memory of reader device 120 and executed by the reader device's processing circuitry. These instructions can also cause calculation of drug delivery amounts and durations (e.g., a bolus infusion and/or a basal infusion profile) based on the analyte level measurements obtained directly or indirectly from sensor control device 102. In some embodiments sensor control device 102 can determine the drug dosage and communicate that to reader device 120.

Example Embodiments of Sensor Control Devices

Figure 3:
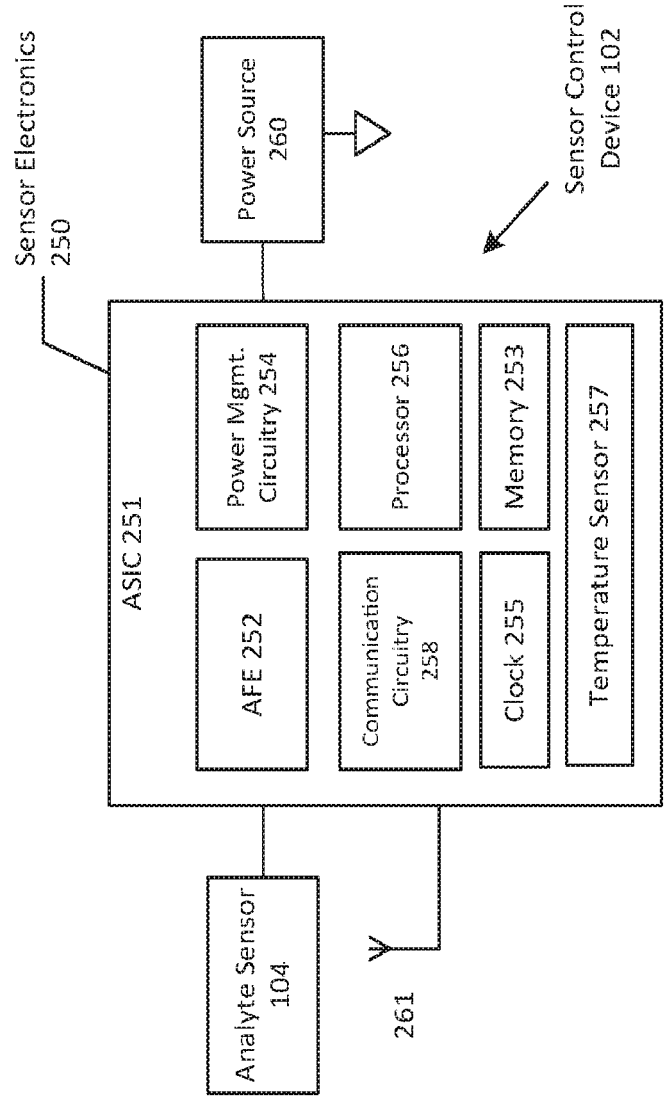
FIG. 3 is a block diagram of an example embodiment of a sensor control device.

FIG. 3 is a block diagram depicting an example embodiment of sensor control device 102 having analyte sensor 104 and sensor electronics 250 (including analyte monitoring circuitry) that can have the majority of the processing capability for rendering end-result data suitable for display to the user. In FIG. 3, a single semiconductor chip 251 is depicted that can be a custom application specific integrated circuit (ASIC). Shown within ASIC 251 are certain high-level functional units, including an analog front end (AFE) 252, power management (or control) circuitry 254, processor 256, and communication circuitry 258 (which can be implemented as a transmitter, receiver, transceiver, passive circuit, or otherwise according to the communication protocol). In this embodiment, both AFE 252 and processor 256 are used as analyte monitoring circuitry, but in other embodiments either circuit can perform the analyte monitoring function. Processor 256 can include one or more processors, microprocessors, controllers, and/or microcontrollers, each of which can be a discrete chip or distributed amongst (and a portion of) a number of different chips.

A memory 253 is also included within ASIC 251 and can be shared by the various functional units present within ASIC 251, or can be distributed amongst two or more of them. Memory 253 can also be a separate chip. Memory 253 is non-transitory and can be volatile and/or non-volatile memory. In this embodiment, ASIC 251 is coupled with power source 260, which can be a coin cell battery, or the like. AFE 252 interfaces with in vivo analyte sensor 104 and receives measurement data therefrom and outputs the data to processor 256 in digital form, which in turn can, in some embodiments, process in any of the manners described elsewhere herein. This data can then be provided to communication circuitry 258 for sending, by way of antenna 261, to reader device 120 (not shown), for example, where minimal further processing is needed by the resident software application to display the data. Antenna 261 can be configured according to the needs of the application and communication protocol. Antenna 261 can be, for example, a printed circuit board (PCB) trace antenna, a ceramic antenna, or a discrete metallic antenna. Antenna 261 can be configured as a monopole antenna, a dipole antenna, an F-type antenna, a loop antenna, and others.

Information may be communicated from sensor control device 102 to a second device (e.g., reader device 120) at the initiative of sensor control device 102 or reader device 120. For example, information can be communicated automatically and/or repeatedly (e.g., continuously) by sensor control device 102 when the analyte information is available, or according to a schedule (e.g., about every 1 minute, about every 5 minutes, about every 10 minutes, or the like), in which case the information can be stored or logged in a memory of sensor control device 102 for later communication. The information can be transmitted from sensor control device 102 in response to receipt of a request by the second device. This request can be an automated request, e.g., a request transmitted by the second device according to a schedule, or can be a request generated at the initiative of a user (e.g., an ad hoc or manual request). In some embodiments, a manual request for data is referred to as a "scan" of sensor control device 102 or an "on-demand" data transfer from device 102. In some embodiments, the second device can transmit a polling signal or data packet to sensor control device 102, and device 102 can treat each poll (or polls occurring at certain time intervals) as a request for data and, if data is available, then can transmit such data to the second device. In many embodiments, the communication between sensor control device 102 and the second device are secure (e.g., encrypted and/or between authenticated devices), but in some embodiments the data can be transmitted from sensor control device 102 in an unsecured manner, e.g., as a broadcast to all listening devices in range.

Different types and/or forms and/or amounts of information may be sent as part of each communication including, but not limited to, one or more of current sensor measurements (e.g., the most recently obtained analyte level information temporally corresponding to the time the reading is initiated), rate of change of the measured metric over a predetermined time period, rate of the rate of change of the metric (acceleration in the rate of change), or historical metric information corresponding to metric information obtained prior to a given reading and stored in a memory of sensor control device 102.

Some or all of real time, historical, rate of change, rate of rate of change (such as acceleration or deceleration) information may be sent to reader device 120 in a given communication or transmission. In certain embodiments, the type and/or form and/or amount of information sent to reader device 120 may be preprogrammed and/or unchangeable (e.g., preset at manufacturing), or may not be preprogrammed and/or unchangeable so that it may be selectable and/or changeable in the field one or more times (e.g., by activating a switch of the system, etc.). Accordingly, in certain embodiments reader device 120 can output a current (real time) sensor-derived analyte value (e.g., in numerical format), a current rate of analyte change (e.g., in the form of an analyte rate indicator such as an arrow pointing in a direction to indicate the current rate), and analyte trend history data based on sensor readings acquired by and stored in memory of sensor control device 102 (e.g., in the form of a graphical trace). Additionally, an on-skin or sensor temperature reading or measurement may be collected by an optional temperature sensor 257. Those readings or measurements can be communicated (either individually or as an aggregated measurement over time) from sensor control device 102 to another device (e.g., reader 120). The temperature reading or measurement, however, may be used in conjunction with a software routine executed by reader device 120 to correct or compensate the analyte measurement output to the user, instead of or in addition to actually displaying the temperature measurement to the user.

In addition, although FIG. 3 depicts a single analyte sensor 104, according to many embodiments of the present disclosure, sensor control device 102 can be configured to collect data indicative of multiple physiological measurements, including but not limited to, data indicative of a glucose level, lactate level, ketone level, or heart rate measurement, to name only a few. In some embodiments, for example, sensor 104 can be a dual-analyte sensor configured to sense a glucose level and a concentration of another analyte (e.g., lactate, ketone, etc.). Additional details regarding dual-analyte sensors are described, for example, in U.S. Publication No. 2019/0320947 A1, which is hereby incorporated by reference for all purposes. In some embodiments, sensor control device 102 can include multiple discrete sensors, each of which is capable of collecting data indicative of any of the aforementioned physiological measurements.

Embodiments of Systems, Devices and Methods for Detection of Suspected Glucose Dropouts Example Characterizations of Glucose and Lactate Levels During Nighttime Glucose Dropouts Nighttime glucose dropouts are a phenomenon observed with analyte monitoring systems, in which a measured glucose concentration from a glucose sensor can suddenly decrease for a short period of time during the night while the user wearing the glucose sensor is asleep. Nighttime glucose dropouts can trigger false low glucose alarms or cause unnecessary medication delivery adjustments if the analyte monitoring system is used with an automated medication delivery system such as, for example, an automated insulin pump.

Previous researchers have theorized that nighttime glucose dropouts are a result of pressure-induced sensor attenuation. However, recent research utilizing dual glucose/lactate sensors (e.g., a glucose sensing element and a lactate sensing element in one analyte sensor) suggests that nighttime glucose dropouts are actually a physiological phenomenon that can cause interstitial glucose concentration to decrease at a particular sensing site. This research also suggests that the physiological phenomenon also causes a lactate concentration to increase concurrently with the decrease in the glucose concentration.

Figure 4B:
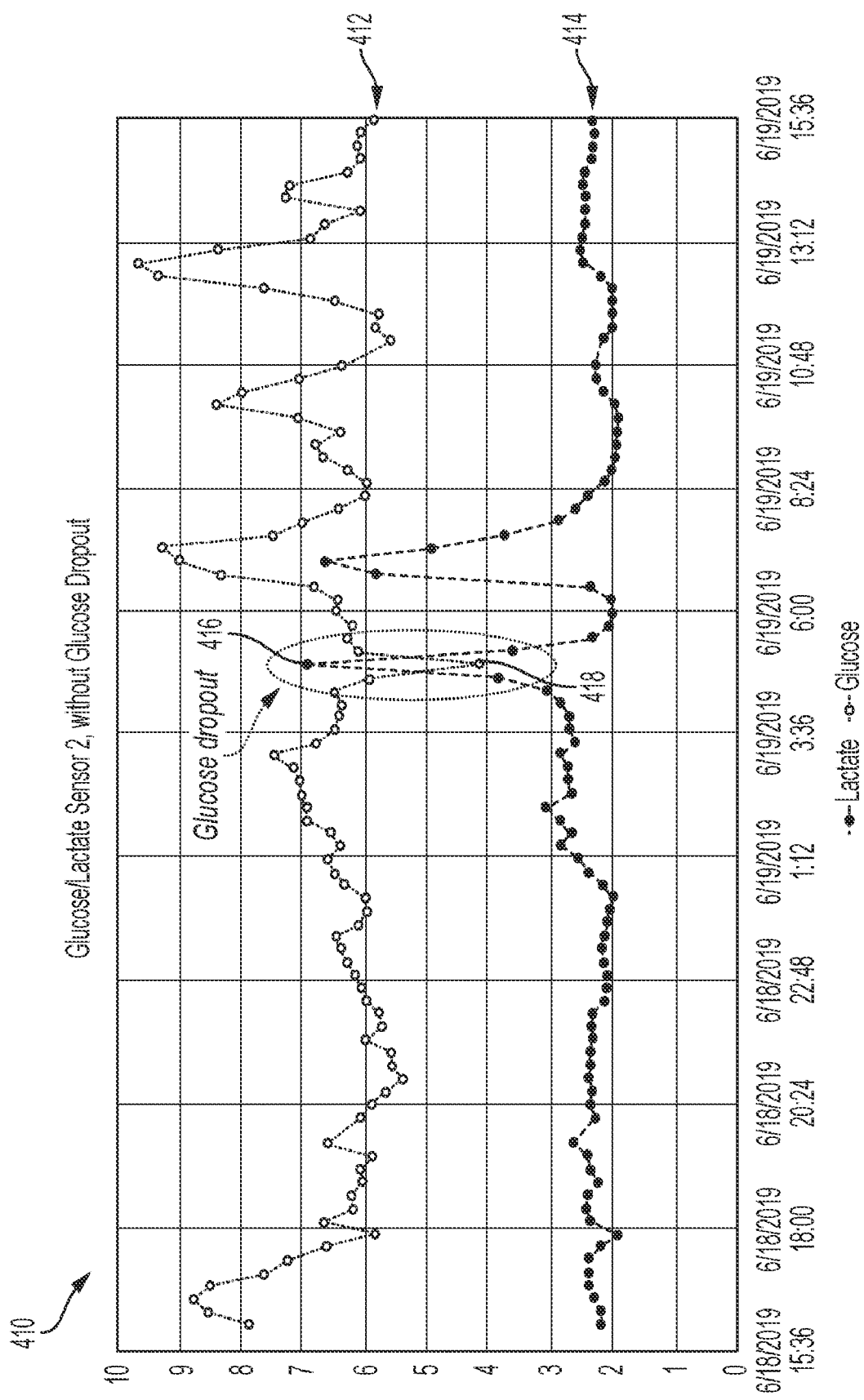

FIGS. 4A and 4B are multi-plot graphs (400, 410), each of which depicts a twenty-four (24) hour plot of a first and a second glucose/lactate sensor worn by the same patient with less than two inches apart. Referring first to FIG. 4A, multi-plot graph 400 for the first dual glucose/lactate sensor includes upper plot 402 indicating a glucose concentration over time, and lower plot 404 indicating a lactate concentration over time. As can be seen from multi-plot graph 400, no nighttime glucose dropouts were experienced by the first dual glucose/lactate sensor.

Referring next to FIG. 4B, multi-plot graph 410 for the second dual glucose/lactate sensor includes upper plot 412 indicating a glucose concentration over time, and lower plot 414 indicating a lactate concentration over time. As indicated by the dotted ellipse, the second dual glucose/lactate sensor experienced a glucose dropout around 5:00 AM, which can be characterized by a sharp decrease in glucose concentration at data point 418 and, concurrently, a sharp increase in lactate concentration at data point 416. Apart from the nighttime glucose dropout event, the glucose and lactate concentration trendlines of multi-plot graphs 400 and 410 are relatively similar.

Based on multi-plot graphs 400 and 410, it can be inferred that both the first and the second dual glucose/lactate sensors functioned properly, but the analytes at the sensing site of the second dual glucose/lactate sensor experienced a nighttime glucose dropout as a result of a physiological change, as reflected in multi-plot graph 410 of FIG. 4B.

Figure 4C:
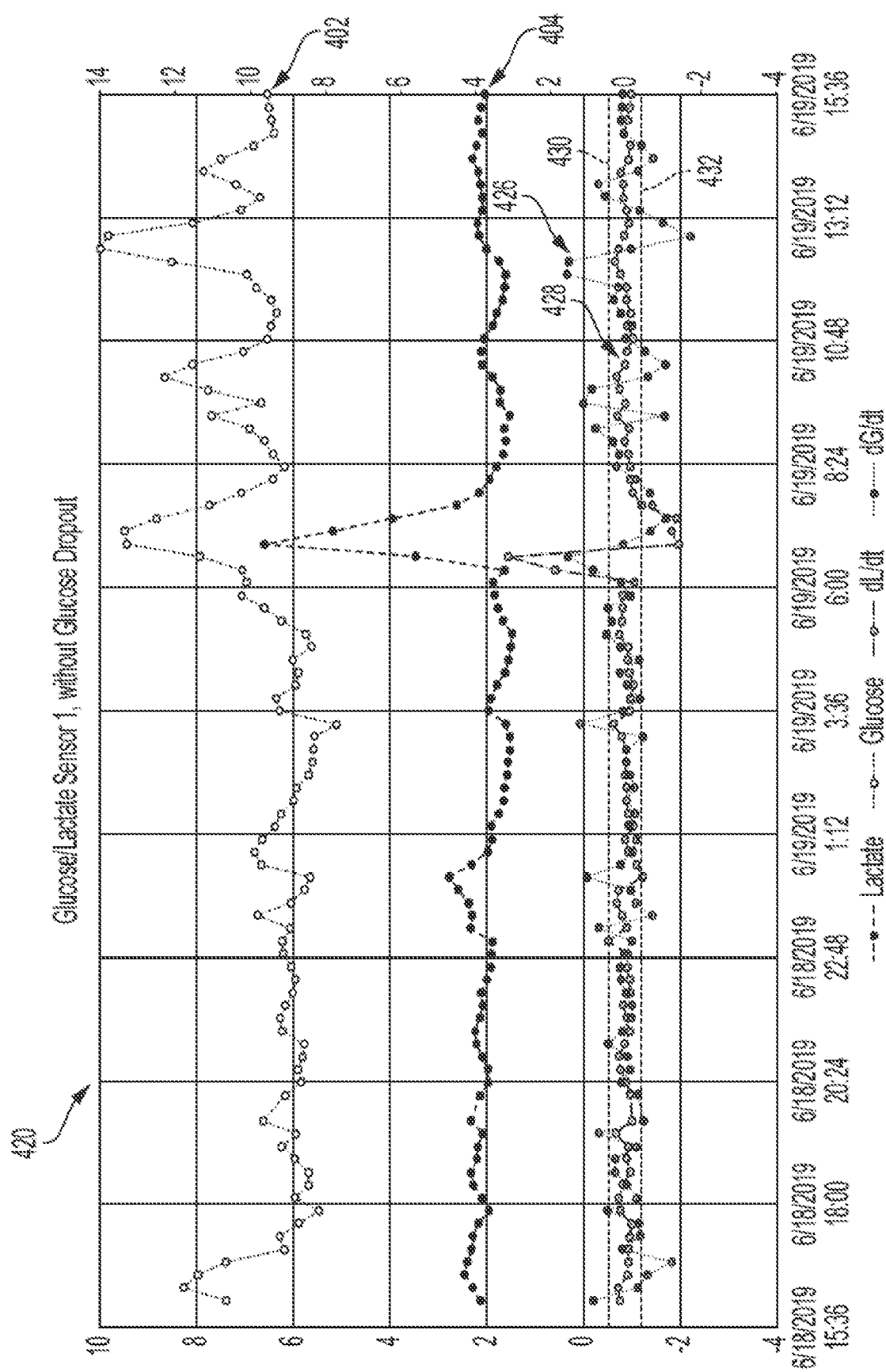
FIGS. 4C and 4D are multi-plot graphs depicting example sensor signals and corresponding derivative values over time.
Figure 4D:
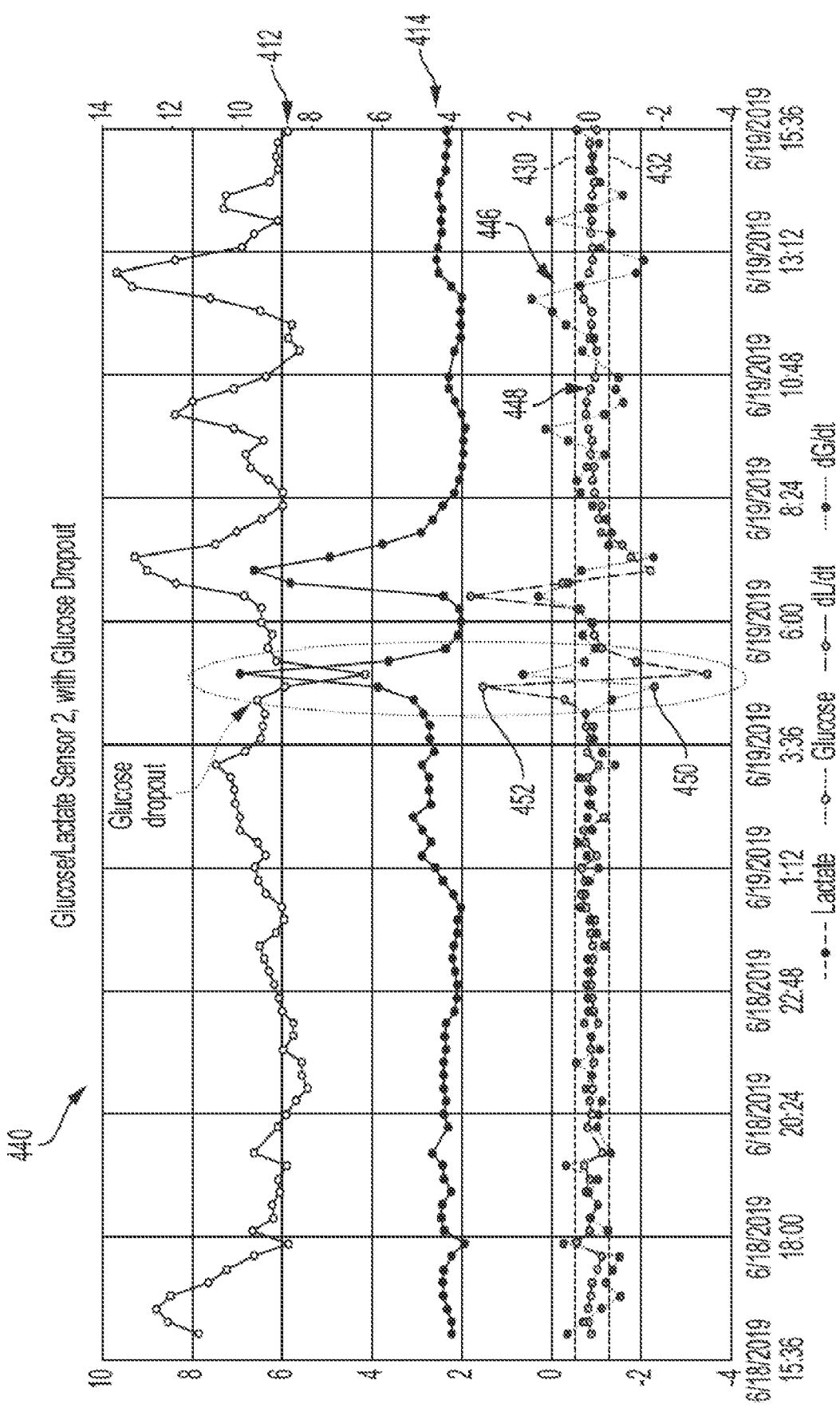

FIGS. 4C and 4D depict further characterizations of glucose and lactate concentration levels during a nighttime glucose dropout, as measured by dual glucose/lactate sensors. Referring first to FIG. 4C, multi-plot graph 420 includes the same upper plot 402 indicating glucose concentration over time, and lower plot 404 indicating lactate concentration over time, as shown in FIG. 4A. As shown below lactate concentration plot 404, graph 420 further includes additional plots 426 and 428, which depict, respectively, derivative values of the glucose concentration and derivative values of the lactate concentration over time. In addition, a pair of predetermined glucose and lactate derivative thresholds are shown as, respectively, dotted lines 430 and 432. According to one aspect of the embodiments, the predetermined thresholds can include a predetermined negative glucose derivative threshold and a predetermined positive lactate derivative threshold, wherein the predetermined thresholds are near or around zero. The absence of nighttime glucose dropouts in the first dual glucose/lactate sensor are characterized by the glucose and lactate derivate values not concurrently crossing their respective predetermined derivative thresholds.

Referring next to FIG. 4D, multi-plot graph 440 includes the same upper plot 412 indicating glucose concentration over time, and lower plot 414 indicating lactate concentration over time, as shown in FIG. 4B. As shown below lactate concentration plot 414, graph 440 further includes additional plots 446 and 448, which depict, respectively, derivative values of the glucose concentration and derivative values of the lactate concentration over time. In addition, a pair of predetermined glucose and lactate derivative thresholds are shown as, respectively, dotted 430 and 432. As shown by the dotted ellipse, the nighttime glucose dropout can be characterized by a glucose derivative value 450 falling below the predetermined negative glucose derivative threshold 432 near or at the same time where the lactate derivative value 352 rises above the predetermined positive lactate derivative threshold 430.

Example Methods for Detecting Suspected Glucose Dropouts

Example embodiments of methods for detecting a suspected glucose dropout in an analyte monitoring system based on glucose and lactate concentration measurements will now be described. Before doing so, it will be understood by those of skill in the art that any one or more of the steps of the example methods described herein can be stored as software instructions in a non-transitory memory of a sensor control device, a reader device, a remote computer, or a trusted computer system, such as those described with respect to FIG. 1. The stored instructions, when executed, can cause the processing circuitry of the associated device or computing system to perform any one or more of the steps of the example methods described herein. It will also be understood by those of skill in the art that, in many of the embodiments, any one or more of the method steps described herein can be performed using real-time or near real-time sensor data. In other embodiments, any one or more of the method steps can be performed retrospectively with respect to stored sensor data, including sensor data from prior sensor wears by the same user. In some embodiments, the method steps described herein can be performed periodically, according to a predetermined schedule, and/or in batches of retrospective processes.

It will also be appreciated by those of skill in the art that the instructions can be stored in non-transitory memory on a single device (e.g., a sensor control device or a reader device) or, in the alternative, can be distributed across multiple discrete devices, which can be located in geographically dispersed locations (e.g., a cloud platform). For example, in some embodiments, the collection of data indicative of an analyte level (e.g., glucose, lactate) can be performed on the sensor control device, whereas the calculation of analyte metrics (e.g., glucose derivative values, lactate derivative values) and the comparison of said analyte metrics to predetermined thresholds can be performed on a reader device, remote computing system, or a trusted computing system. In some embodiments, the collection of analyte data and comparison of with predetermined thresholds can be performed solely on the sensor control device. Likewise, those of skill in the art will recognize that the representations of computing devices in the embodiments disclosed herein, such as those shown in FIG. 1, are intended to cover both physical devices and virtual devices (or "virtual machines").

Figure 5:
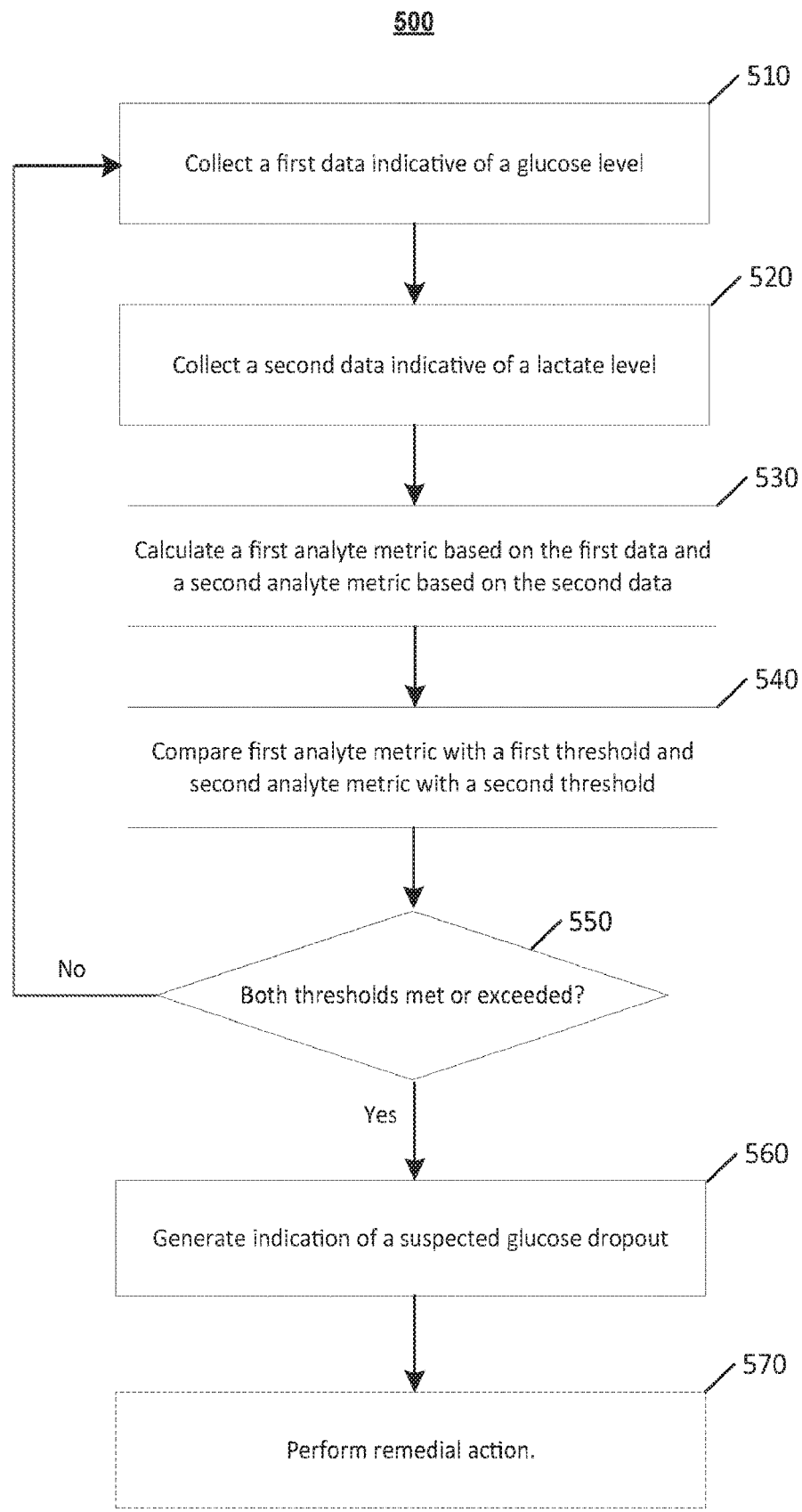
FIG. 5 is a flow diagram depicting an example embodiment of a method for detecting a suspected glucose dropout.

FIG. 5 is a flow diagram of an example embodiment of a method 500 for detecting a suspected glucose dropout. At Step 510, a first data indicative of a glucose level is collected by an analyte sensor, such as those described with respect to FIGS. 1 and 3. At Step 520, a second data indicative of a lactate level is collected by a lactate sensing element. According to some embodiments, Steps 510 and 520 can be performed by a sensor control unit comprising an analyte sensor having a portion that is configured to be inserted into a user's body at an insertion site, wherein the portion includes a first sensing element configured to sense a glucose level in a bodily fluid and a second sensing element configured to sense a lactate level in the bodily fluid of the same insertion site. In other embodiments, Steps 510 and 520 can be performed by a sensor control unit comprising a first analyte sensor and a second analyte sensor, wherein the first analyte sensor is configured to sense a glucose level in a bodily fluid and the second analyte sensor is configured to sense a lactate level in the bodily fluid, and wherein the first and second analyte sensors are configured to sense analyte levels at the same localized site of insertion.

Referring still to FIG. 5, at Step 530, a first analyte metric based on the first data is calculated and a second analyte metric based on the second data is calculated. According to many of the embodiments, the first analyte metric is a glucose derivative and the second analyte metric is a lactate derivative. At Step 540, the first analyte metric is compared with a first threshold and the second analyte metric is compared with a second threshold. According to many of the embodiments, the first threshold can be a predetermined glucose derivative threshold, and the second threshold can be a predetermined lactate derivative threshold. Furthermore, according to some embodiments, the first threshold can be a negative threshold value and the second threshold can be a positive threshold value.

At Step 550, a determination is made, based on the comparison in previous Step 540, as to whether both the first and second thresholds have been met or exceeded. For example, according to some embodiments, the first threshold can be a predetermined negative glucose derivative threshold and the second threshold can be a predetermined positive lactate derivative threshold. In such cases, the first threshold (e.g., predetermined glucose derivative threshold) is met and/or exceeded when the first analyte metric (e.g., glucose derivative) is less than or equal to the first threshold, and the second threshold (e.g., predetermined lactate derivative threshold) is met and/or exceeded when the second analyte metric (e.g., lactate derivative) is greater than or equal to the second threshold.

According to another aspect of the embodiments, the determination as to whether the thresholds have been met or exceeded can further include an evaluation of whether the thresholds have been met or exceeded simultaneously or near simultaneously. In some embodiments, for example, the first and second analyte metrics can be derived from analyte level data that is collected in the same time period, such as by use of a sliding window, wherein the sliding window can be defined by a predetermined number of data points (e.g., last five glucose derivative values, last five lactate derivative values), or a predetermined duration of time (e.g., 5, 10, 15 minute windows). In other embodiments, the determination as to whether the thresholds have been met or exceeded can include a comparison of an average glucose derivative value over a first predetermined time period with an average lactate derivative value over a second predetermined time period. Those of skill in the art will recognize that other methods by which to assess whether two analyte level metrics meet or exceed a corresponding threshold can be utilized and are fully within the scope of the present disclosure.

Similarly, those of skill in the art will further appreciate that variations for the first and second thresholds can be utilized. In some embodiments, for example, the first and second analyte metric can be, respectively, an absolute value of a glucose derivative and an absolute value of a lactate derivative. Accordingly, the first and second thresholds can also be a predetermined absolute value of a glucose derivative threshold and a predetermined absolute value of a lactate derivative threshold.

Referring again to FIG. 5, if both thresholds are not met and/or exceeded, then method 500 returns to Step 510. However, if both thresholds are met and/or exceeded, then at Step 560, an indication of a suspected glucose dropout is generated. In some embodiments, the indication of the suspected glucose dropout can comprise a visual output to a display of a reader device, remote computer, or a trusted computer system, such as those described with respect to FIG. 1. For example, in some embodiments, generation of an indication of a suspected glucose dropout can result in a notification or message displayed on a sensor results screen of a software application running on a user's mobile device. Similarly, in some embodiments, the indication of a suspected glucose dropout can comprise one or more of a visual, audio, or vibratory alert or alarm that is output to a display of a reader device, remote computer, or trusted computer system. Subsequently, at Step 570, a remedial action can be optionally performed in response to, or instead of, the indication of the suspected glucose dropout. In some embodiments, for example, the remedial action can be suppressing a low glucose alarm. In other embodiments, a remedial action can be preventing the issuance of a command to alter or cause the delivery of medication (e.g., insulin) by an automated medication delivery system (e.g., insulin pump).

Embodiments of Systems, Devices and Methods for Lactate-Based Correction of Glucose Levels Example Characterizations of Lactate Concentrations During Late Sensor Attenuation Late sensor attenuation ("LSA," also referred to as "droop") is a phenomenon in which a partially-implanted (e.g., subcutaneous, transcutaneous) or fully-implanted glucose sensor can experience a decrease in sensitivity during the latter phase of the sensor's prescribed wear life. LSA occurs in a relatively small percentage of sensors and typically commences, for example, around Days 10-12 in a glucose sensor having a fourteen-day wear life.

Research utilizing dual glucose/lactate sensors (e.g., a glucose sensing element and a lactate sensing element in one analyte sensor) has suggested a relationship between LSA and lactate concentration levels measured at the insertion site of the sensor. In particular, data acquired through the use of dual glucose/lactate sensors demonstrates a correlation between LSA, or a decrease in glucose sensitivity, and a rise in baseline lactate values during the same time period.

According to one aspect of the embodiments, the aforementioned relationship between LSA and a rise in baseline lactate value can be used to correct one or more artificially depressed glucose measurements. In particular, the following equation can be utilized:

$$i_{Glucose(corrected)} = i_{Glucose(raw)} + K_c(i_{Lactate} - i_{Lactate\ (baseline)}), \text{ where:}$$

$i_{Glucose\ (raw)}$ is the glucose current prior to correction;
$i_{Lactate}$ is the lactate current at the time of correction;
$i_{Lactate\ (baseline)}$ is a baseline lactate current; and
$K_c$ is a sensor batch constant.

According to some embodiments, $i_{Lactate}$ is a smoothed value, such as a one-hour smoothed lactate current, to remove transient variations in the lactate value. Those of skill in the art will recognize that other smoothed lactate values (e.g., over 30 minutes, two hours, five hours) can be utilized and are fully within the scope of the present disclosure.

According to another aspect of some embodiments, $i_{Lactate\ (baseline)}$ can be a baseline lactate current over a predetermined time period in which the glucose sensor is less likely to be affected by LSA. In some embodiments, for example, the $i_{Lactate\ (baseline)}$ can be an average lactate current over Days 5-8 of the sensor wear period. Those of skill in the art will appreciate that other predetermined time periods (e.g., Days 4-7, Days 6-8, etc.) can be utilized to calculate the baseline lactate current, and are fully within the scope of the present disclosure.

Figure 6A:
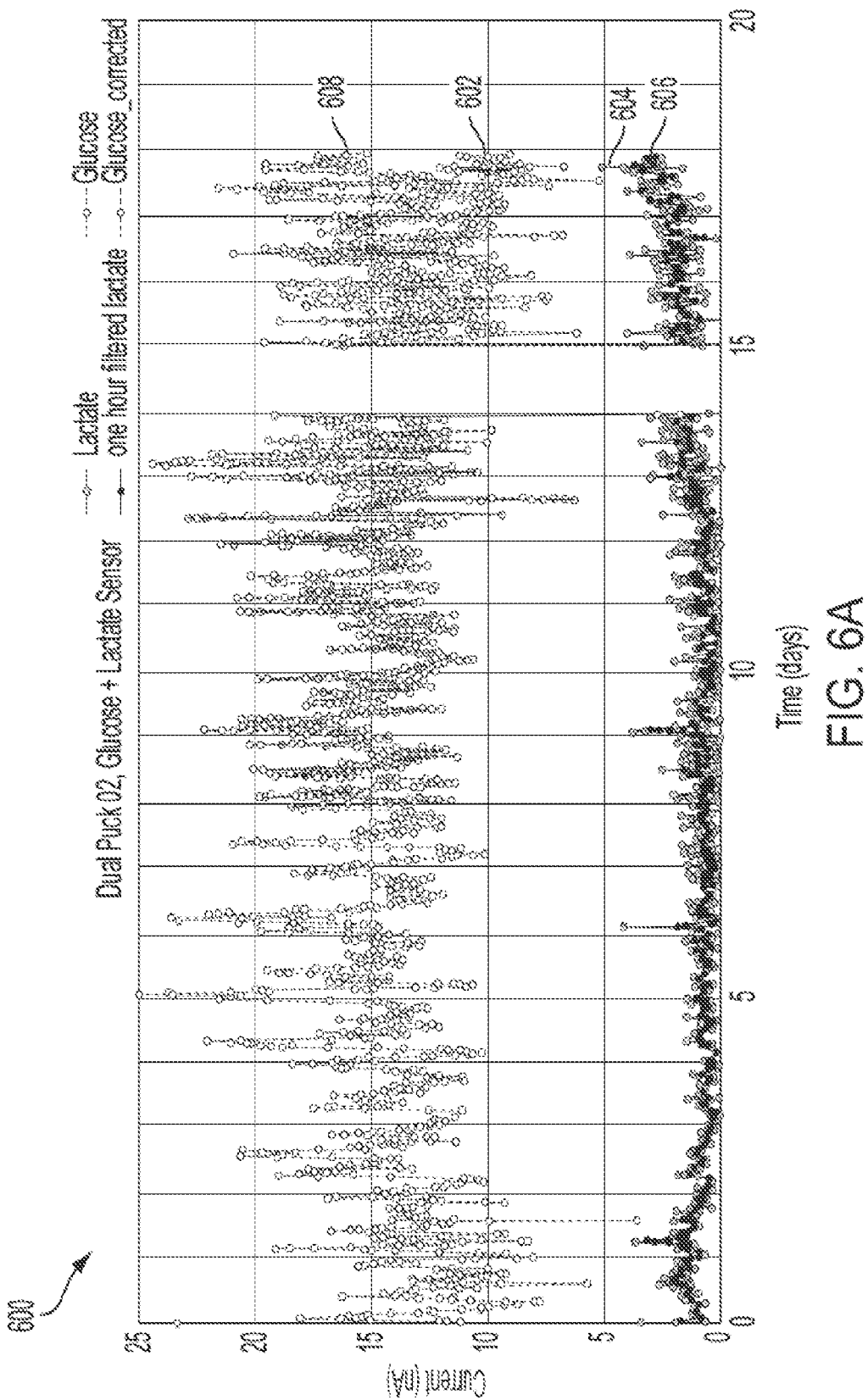
FIGS. 6A, 6B, and 6C are multi-plot graphs depicting example sensor signals and corresponding corrected sensor measurements over time.
Figure 6B:
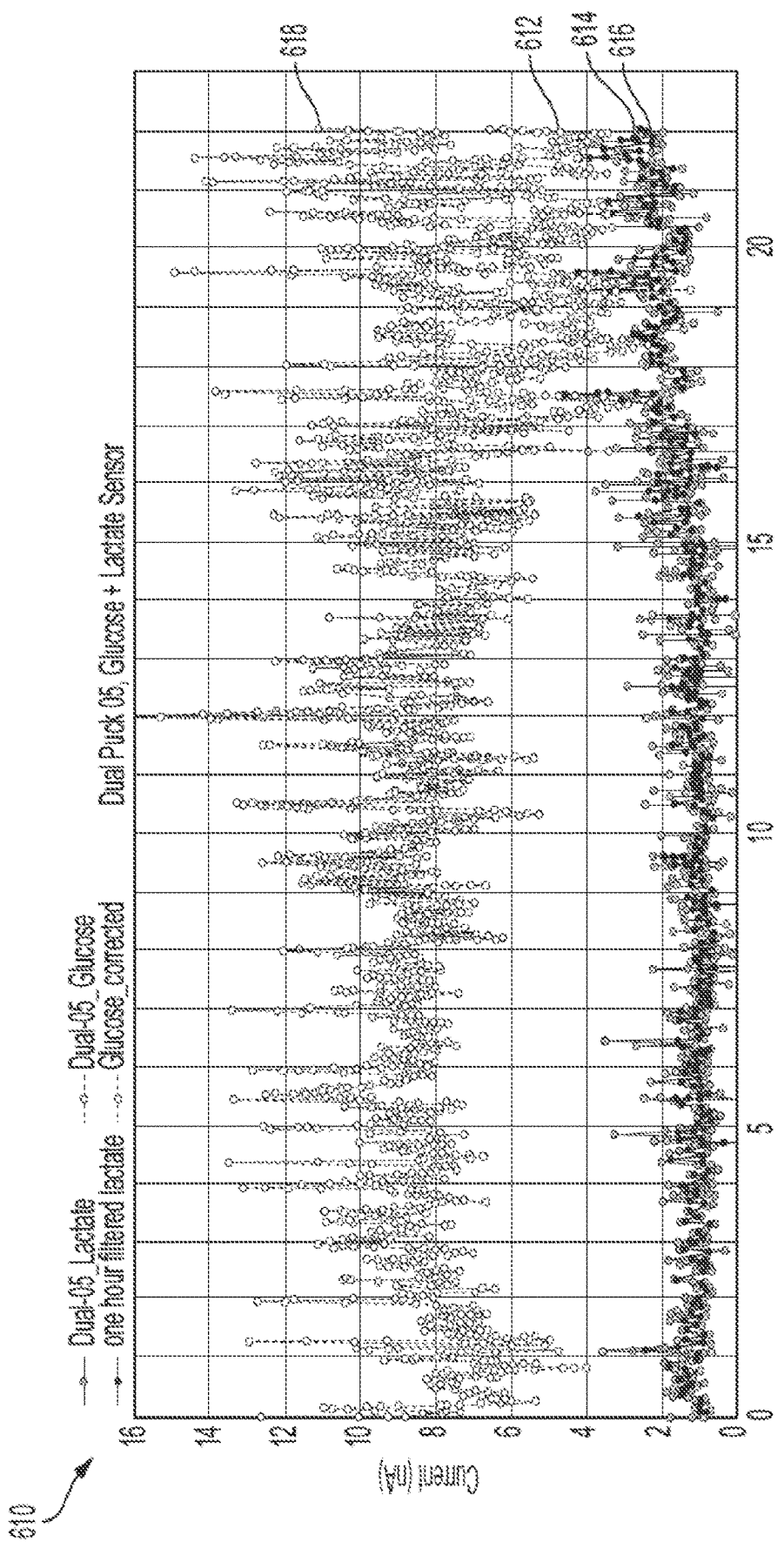
Figure 6C:
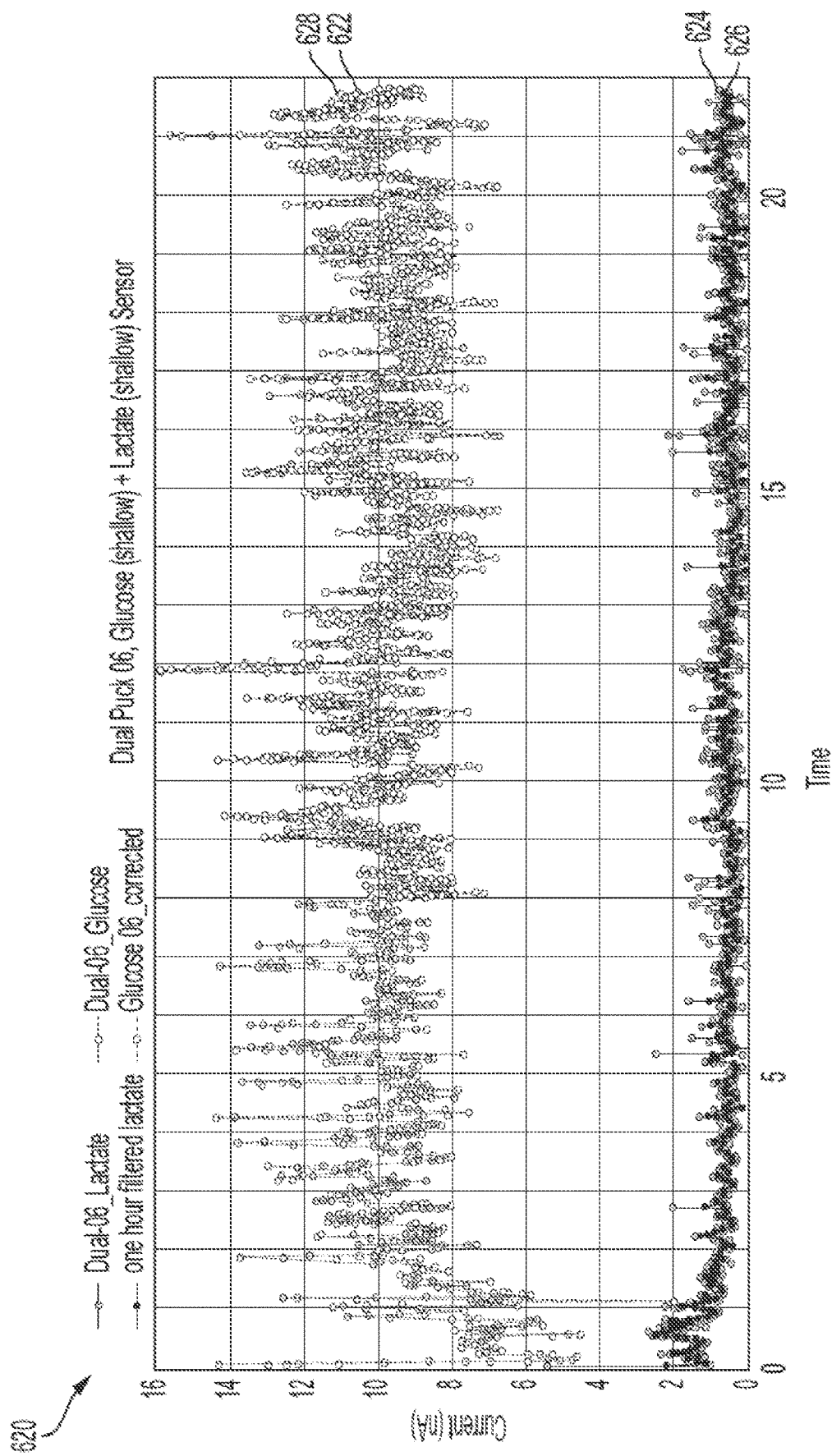

According to another aspect of the embodiment, $K_c$ can be an empirically determined constant assigned to a given batch of sensors. In FIGS. 6A-6C, described below, sensor batch constant, $K_c=3$. Those of skill in the art will understand that other sensor batch constants can be utilized and are included within the scope of the present disclosure.

FIG. 6A is a multi-plot graph 600 depicting various analyte measurements taken by a dual glucose/lactate sensor over a twenty-day time period. Multi-plot graph 600 includes, at top, plot 602 of uncorrected glucose current. At the bottom of multi-plot graph 600, plot 604 of unfiltered lactate current and plot 604 of one-hour filtered lactate values are also shown. According to one aspect of multi-plot graph 600, plot 608 of corrected glucose levels, based on the aforementioned lactate-based glucose correction equation, is depicted adjacent to uncorrected glucose current plot 602. Additionally, LSA can be seen beginning at or around Day 12 in graph 600, as evidenced by a gradual decrease in uncorrected glucose current plot 602 (i.e., indicating a gradual decrease in the glucose sensor's sensitivity), while unfiltered lactate current plot 604 and one-hour filtered lactate values plot 606 gradually increase over the same time period.

FIG. 6B is another multi-plot graph 610 depicting various analyte measurements taken by a dual glucose/lactate sensor over a twenty-day time period. Like previous graph 600, multi-plot graph 610 includes, at top, plot 612 of uncorrected glucose current. At the bottom of multi-plot graph 610, plot 614 of unfiltered lactate current and plot 616 of one-hour filtered lactate values are also shown. According to one aspect of graph 610, plot 618 of corrected glucose levels, based on the aforementioned lactate-based glucose correction equation, is depicted adjacent to uncorrected glucose current plot 612. LSA, which is relatively more pronounced compared to multi-plot graph 600, can be seen beginning at or around Day 15 in graph 610, when the uncorrected glucose current plot 612 decreases sharply (i.e., indicating a large decline in the glucose sensor's sensitivity), while unfiltered lactate current plot 614 and one-hour filtered lactate value plot 616 increase sharply over the same period. According to an aspect of multi-plot graph 610, a more pronounced LSA is evidenced by a greater increase in the lactate plots 614, 616 during the latter stage of wear (e.g., Days 18-20), as well as a greater divergence between uncorrected glucose current plot 612 and corrected glucose values plot 618.

FIG. 6C is another multi-plot graph 620 depicting various analyte measurements taken by a dual glucose/lactate sensor over a twenty-day time period. Multi-plot graph 620 includes, at top, plot 622 of uncorrected glucose current. At the bottom of multi-plot graph 620, plot 624 of unfiltered lactate current and plot 626 of one-hour filtered lactate values are also shown. According to one aspect of graph 620, plot 628 of corrected glucose levels, based on the aforementioned lactate-based glucose correction equation, is depicted adjacent to uncorrected glucose current plot 622. LSA is not present in the sensor depicted in multi-plot graph 620, as exemplified by a relatively stable pair of lactate measurements 624, 626 from Day 15 to Day 20. Accordingly, corrected and uncorrected glucose plots 622 and 628, respectively, are nearly identical during the same time period.

Example Methods for LSA Correction and Sensor Fault Detection

Example embodiments of methods for correcting artificially depressed glucose values using lactate values, and methods for sensor fault detection will now be described.

As with previous embodiments, it will be understood by those of skill in the art that any one or more of the steps of the example methods described herein can be stored as software instructions in a non-transitory memory of a sensor control device, a reader device, a remote computer, or a trusted computer system, such as those described with respect to FIG. 1. The stored instructions, when executed, can cause the processing circuitry of the associated device or computing system to perform any one or more of the steps of the example methods described herein. It will also be understood by those of skill in the art that, in many of the embodiments, any one or more of the method steps described herein can be performed using real-time or near real-time sensor data. In other embodiments, any one or more of the method steps can be performed retrospectively with respect to stored sensor data, including sensor data from prior sensor wears by the same user. For example, in some embodiments, the method steps described herein can be performed periodically, according to a predetermined schedule, and/or in batches of retrospective processes.

It will also be appreciated by those of skill in the art that the instructions can be stored in non-transitory memory on a single device (e.g., a sensor control device or a reader device) or, in the alternative, can be distributed across multiple discrete devices, which can be located in geographically dispersed locations (e.g., the cloud). For example, in some embodiments, the collection of data indicative of an analyte level (e.g., glucose, lactate) can be performed on the sensor control device, whereas the correction of analyte values, calculation of analyte metrics (e.g., baseline lactate values), and the comparison of said analyte metrics to predetermined thresholds can be performed on a reader device, remote computing system, or a trusted computing system. In some embodiments, the collection of analyte level data and correction of analyte values can be performed solely on the sensor control device. Likewise, those of skill in the art will recognize that the representations of computing devices in the embodiments disclosed herein, such as those shown in FIG. 1, are intended to cover both physical devices and virtual devices (or "virtual machines").

Figures 7A, 7B:
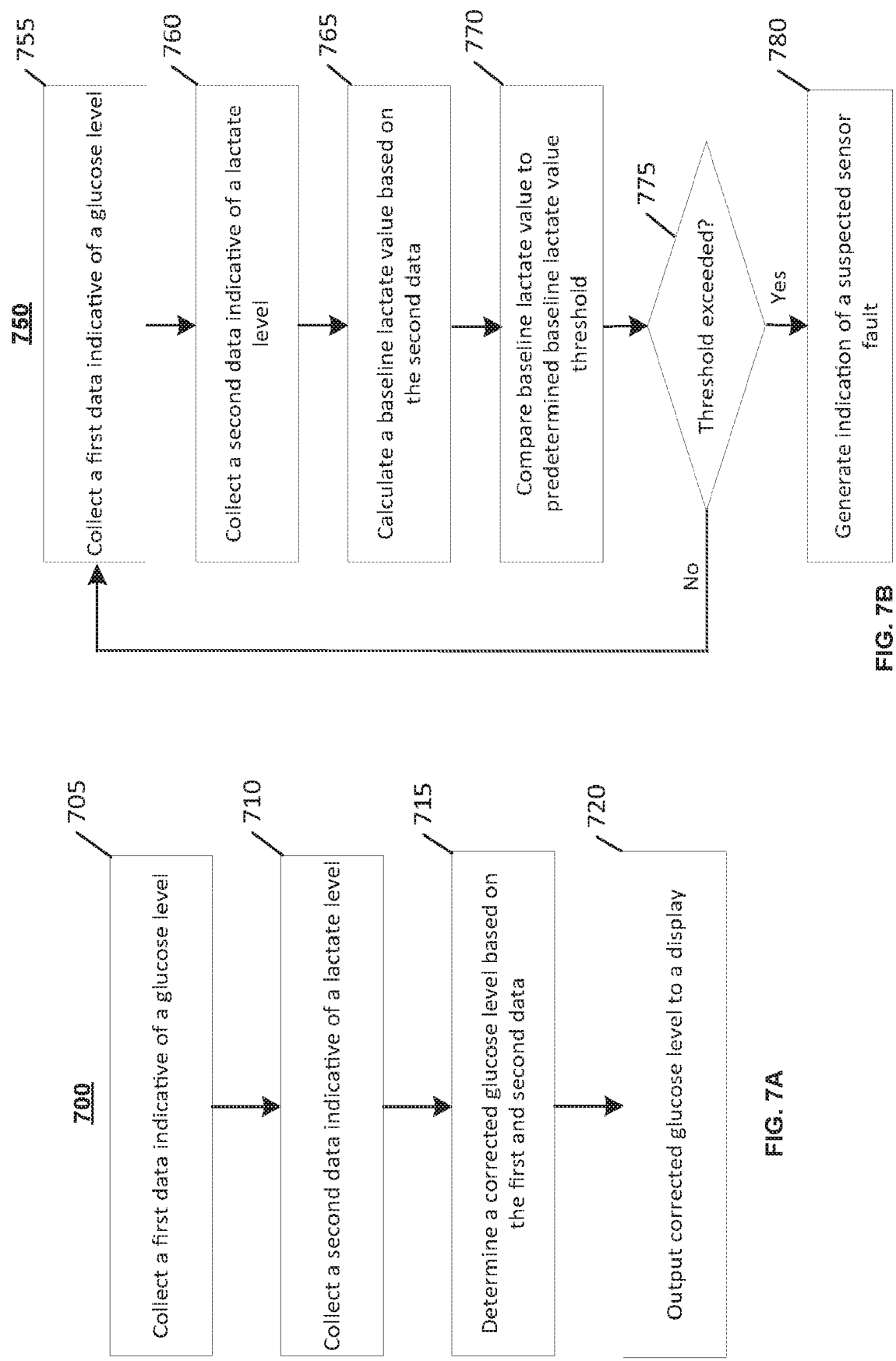
FIGS. 7A and 7B are flow diagrams depicting, respectively, an example embodiment of a method for determining a corrected glucose level and an example embodiment of a method for determining a suspected sensor fault condition.

FIG. 7A is a flow diagram depicting an example embodiment of a method 700 for correcting artificially depressed glucose level measurements, such as those resulting from LSA, using lactate level measurements. At Step 705, a first data indicative of a glucose level is collected by an analyte sensor, such as those described with respect to FIGS. 1 and 3. At Step 710, a second data indicative of a lactate level is collected by a lactate sensing element. According to some embodiments, Steps 705 and 710 can be performed by a sensor control unit comprising an analyte sensor having a portion that is configured to be inserted into a user's body at an insertion site, wherein the portion includes a first sensing element configured to sense a glucose level in a bodily fluid and a second sensing element configured to sense a lactate level in the bodily fluid of the same insertion site. In other embodiments, Steps 705 and 710 can be performed by a sensor control unit comprising a first analyte sensor and a second analyte sensor, wherein the first analyte sensor is configured to sense a glucose level in a bodily fluid and the second analyte sensor is configured to sense a lactate level in the bodily fluid, and wherein the first and second analyte sensors are configured to sense analyte levels at the same localized site of insertion.

Referring still to FIG. 7A, at Step 715, a corrected glucose level is determined based on a function of the first data and the second data. According to many of the embodiments, the function of the first data and the second data can include a measured glucose level, a measured lactate level, and a baseline lactate level. In addition, in many of the embodiments, the function can include a sensor batch constant, wherein the sensor batch constant is associated with a batch of sensors including the analyte sensor.

According to another aspect of the embodiments, the measured glucose level can be indicative of a sensed glucose level at a first time period, and the measured lactate level can be indicative of a sensed lactate level at a second time period. In many of the embodiments, the sensed lactate level at the second time period can comprise a smoothed lactate value over a one-hour time period. Those of skill in the art will recognize that other time periods (e.g., thirty minutes, two hours, five hours, etc.) can be used and are fully within the scope of the present disclosure. Furthermore, in some embodiments, the first time period can overlap or fall within the second time period.

According to another aspect of the embodiments, the baseline lactate value can be an average lactate value over one or more days (e.g., two days, three days, etc.). In some embodiments, for example, the one or more days can occur during a middle portion of a sensor life of the analyte sensor.

Referring still to FIG. 7A, at Step 720, the corrected glucose level can be visually output to a display. In many of the embodiments, for example, the corrected glucose level can be output to a display of the reader device, a remote computing device, and/or a trusted computer system, as described with respect to FIG. 1.

FIG. 7B is a flow diagram depicting an example embodiment of a method 750 for detecting a suspected sensor fault using lactate level measurements. At Step 755, a first data indicative of a glucose level is collected by an analyte sensor, such as those described with respect to FIGS. 1 and 3. At Step 760, a second data indicative of a lactate level is collected by a lactate sensing element. According to some embodiments, Steps 755 and 760 can be performed by a sensor control unit comprising an analyte sensor having a portion that is configured to be inserted into a user's body at an insertion site, wherein the portion includes a first sensing element configured to sense a glucose level in a bodily fluid and a second sensing element configured to sense a lactate level in the bodily fluid of the same insertion site. In other embodiments, Steps 755 and 760 can be performed by a sensor control unit comprising a first analyte sensor and a second analyte sensor, wherein the first analyte sensor is configured to sense a glucose level in a bodily fluid and the second analyte sensor is configured to sense a lactate level in the bodily fluid, and wherein the first and second analyte sensors are configured to sense analyte levels at the same localized site of insertion.

Referring still to FIG. 7B, at Step 765, a baseline lactate value is calculated using the second data. In many of the embodiments, the baseline lactate value can comprise an average lactate value over one or more days. At Step 770, the baseline lactate value is compared to a predetermined baseline lactate value threshold. Subsequently, at Step 775, it is determined whether the baseline lactate value meets or exceeds the predetermined baseline lactate value threshold. If it does not, then method 750 returns to Step 755. If the predetermined baseline lactate value threshold is met or exceeded, then at Step 780, an indication of a suspected sensor fault is generated. According to many of the embodiments, the indication of the suspected sensor fault can further comprise one or more of a command to terminate the analyte sensor; to mask or discard the measured glucose levels; and/or to cause the reader device, remote computing system, or trusted computer system to display a notification, alert, or alarm.

Embodiments of Systems, Devices and Methods for Improving Glucose Sensor Performance by Using Secondary Physiological Measurements Several factors including calibration variation between sensors and temporal variations (such as, e.g., ESA, LSA, and nighttime dropouts) can adversely affect a glucose sensor's low-end performance. In addition, the uncertainty associated with these factors can also limit the amount of lag correction that can be applied to glucose level readings. It would therefore be beneficial to be able to discern between true high/low glucose conditions (e.g., hypoglycemia, hyperglycemia) and false high/low glucose conditions in order to determine an optimal amount of lag correction, to improve sensitivity and specificity of sensor fault detection, and to improve the overall low-end accuracy of the glucose sensor.

The increasing adoption of wearable devices capable of quantifying a person's state of health presents an opportunity to leverage information from non-glucose sensors (also referred to as "secondary sensors") to improve the low-end performance of glucose sensors. Examples of non-glucose sensors, or "secondary" sensors, include, but are not limited to, heart rate monitors, insertable cardiac monitors, implantable electrocardiogram (ECG) devices, implantable electroencephalogram (EEG) devices, ketone sensors, continuous ketone monitors, ketone strip readers, to name a few. These non-glucose or "secondary" sensors can provide secondary physiological measurements that can then be analyzed along with glucose level readings from a glucose sensor to either confirm or contradict a high/low glucose condition detected by the glucose sensor.

For example, when blood glucose is in a hyperglycemic range for an extended period of time, it has been demonstrated that ketone levels will gradually increase. Accordingly, ketone level measurements from either strip-based or continuous ketone monitors can be utilized to determine, along with glucose-based fault detection modules, whether a persistent low glucose sensor reading is physiologically likely or not.

As another example, when blood glucose is in a hypoglycemic range for an extended period of time, it has been demonstrated that hypoglycemia can have pathophysiological effects on cardiac workload, QT interval, and other factors. Many of these factors (e.g., heart rate, ECG, and EEG) can be measured by wearables and other similar medical devices. For example, research has shown that arrhythmias can occur during hypoglycemia. Similarly, other research has demonstrated the use of EEG to infer hypoglycemia. Accordingly, data from secondary sensors (e.g., heart rate monitors, ECG, EEG, etc.) can be used to confirm true hypoglycemia versus false low glucose conditions.

In addition to the benefits described above, fusing secondary physiological measurements from non-glucose or "secondary" sensors with data from glucose sensors can improve low-end glucose sensor performance in at least two other ways. First, a more aggressive lag correction can be applied at the low end of a glucose range because the likelihood of false low glucose readings (e.g., due to ESA, LSA, or nighttime dropouts) is reduced. Second, non-glucose or "secondary" physiological measurements can be utilized in conjunction with glucose sensor data to better detect sensor faults in order to either temporarily mask glucose readings, adjust glucose readings, or terminate a glucose sensor early.

Figure 8:
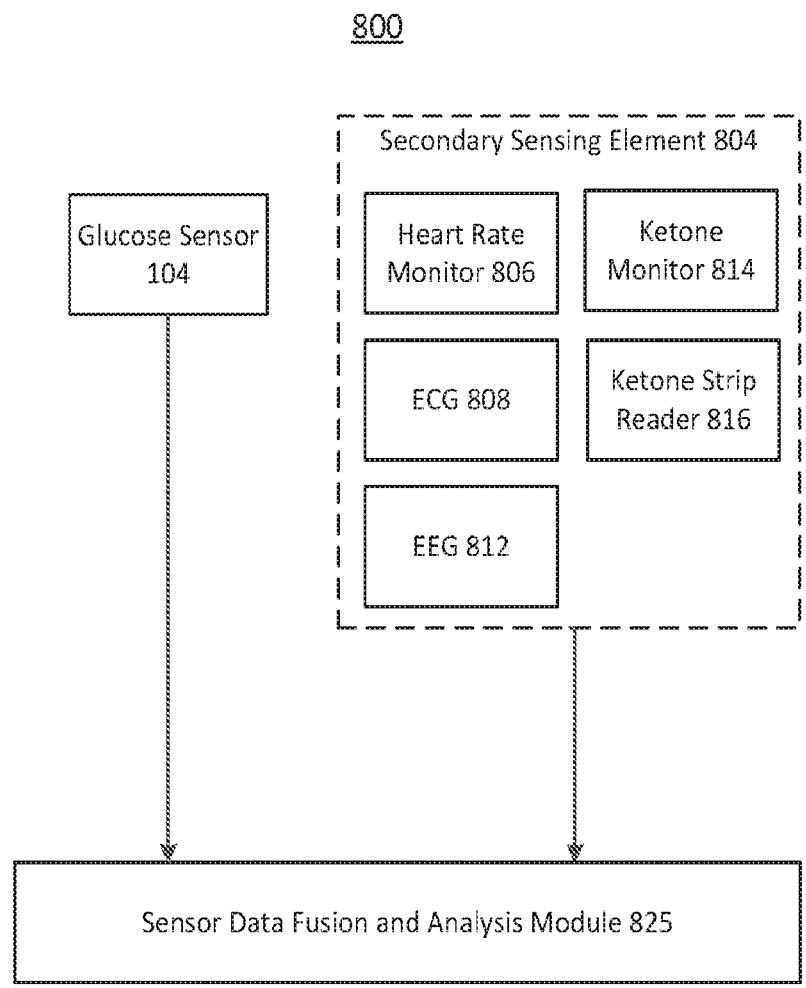
FIG. 8 is a block diagram depicting a system for improving the performance of a glucose sensor using secondary physiological measurements.

Before discussing the details of example embodiments of methods for fusing glucose sensor data and secondary sensor data, it is first desirable to describe examples of systems and devices, as well as examples of their operation, which can be used to perform the methods described herein. FIG. 8 is a logical diagram depicting one aspect of the example embodiments described herein. According to one aspect of the embodiments shown in FIG. 8, a glucose sensor 104 collects data indicative of a glucose level and provides the data to sensor data fusion and analysis module 825. Similarly, a secondary sensing element 804 collects data indicative of a secondary physiological measurement and provides the data to sensor data fusion and analysis module 825. Secondary sensing element 804 can include one or more of a heart rate monitor 806, ECG 808, EEG 812, ketone monitor 814, or a ketone strip reader 816. Furthermore, those of skill in the art will appreciate that other secondary sensing elements 804 (e.g., implantable or insertable heart monitors, lactate sensors, etc.) can be utilized and are fully within the scope of the present disclosure. Sensor data fusion and analysis module 825 then analyzes the first and second data to determine: whether a true high/low glucose condition is present (e.g., hyperglycemia, hypoglycemia), whether to apply a lag correction to glucose level readings, whether to apply data smoothing to glucose level readings, a degree of lag correction and/or data smoothing to apply to glucose level readings, whether to mask certain glucose level readings, whether to terminate the glucose sensor, or whether to generate a notification, alarm, or alert relating to any of the aforementioned actions. Additional details regarding the method steps to make these determinations are described below with respect to FIG. 10.

Figure 9A:
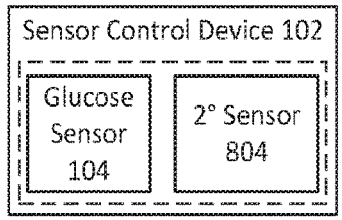
FIGS. 9A to 9E are block diagrams depicting various systems for improving the performance of a glucose sensor using secondary physiological measurements.

FIGS. 9A to 9E depict system overview diagrams showing various example systems and devices that can be used to perform the example embodiments of methods described herein. FIG. 9A is a system overview diagram of a single sensor control device 102 that includes a glucose sensor 104 and a secondary sensing element 804, such as those described with respect to FIG. 8. According to some embodiments, glucose sensor 104 can be a dual analyte sensor that includes, or is integrated with, secondary sensing element 804 (as indicated by the dashed rectangle), wherein secondary sensing element 804 is configured to collect data indicative of a secondary physiological measurement, such as, e.g., a ketone level or a lactate level.

According to other embodiments, glucose sensor 104 and secondary sensing element 804 can comprise two discrete sensors configured to measure, respectively, a glucose level and a secondary physiological measurement (e.g., ketone level), near or around the same insertion site. According to one aspect of the embodiments, sensor control device 102 can include processing circuitry coupled with a non-transitory memory, wherein the non-transitory memory stores software and/or firmware instructions (e.g., sensor data fusion and analysis module 825) that, when executed by the processing circuitry of sensor control device 102, causes the processing circuitry to perform the method steps described below.

Figure 9B:
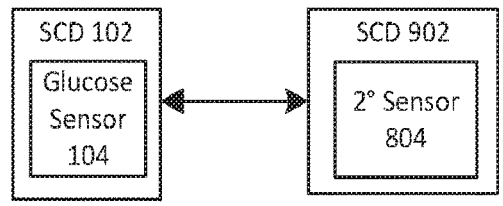

FIG. 9B depicts a system overview diagram showing a first sensor control device 102 having a glucose sensor 104 and a second sensor control device 902 having a secondary sensing element 804. According to the embodiment shown in FIG. 9B, data can be communicated between the two sensor control devices, and sensor data fusion and analysis module 825 can reside in non-transitory memory of either sensor control devices 102, 902. Those of skill in the art will recognize that, although FIG. 9B depicts a double-sided arrow indicating bi-directional communication between sensor control devices 102, 902, some embodiments can utilize unidirectional data transmission only (e.g., where sensor control device 902 transmits data to sensor control device 102, and where sensor data fusion and analysis module 825 resides in non-transitory memory of sensor control device 102).

Figure 9C:
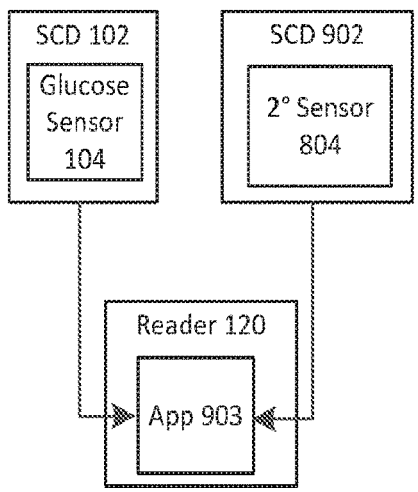
Figure 9D:
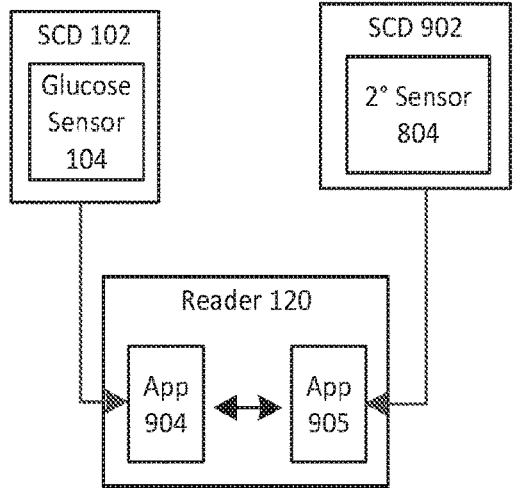

FIG. 9C depicts a system overview diagram showing a first sensor control device 102 having a glucose sensor 104 and a second sensor control device 902 having a secondary sensing element 804. According to the embodiment shown in FIG. 9C, data is communicated from each sensor control device (102, 902) to reader device 120, which can have a mobile software application ("app") 903 configured to receive both types of data and also perform the sensor data fusion and analysis module 825. FIG. 9D similarly depicts a system overview diagram showing a first sensor control device 102 having a glucose sensor 104 and a second sensor control device 902 having a secondary sensing element 803, wherein each sensor control device 102, 902 is configured to communicate with reader device 120. According to the embodiments shown in FIG. 9D, first sensor control device 102 is configured to transmit data indicative of a glucose level to app 904, which resides in non-transitory memory of reader device 120, and second sensor control device 902 is configured to transmit data indicative of a secondary physiological measurement to app 905, which also resides in non-transitory memory of reader device 120. According to another aspect of the embodiments in FIG. 9D, app 904 and app 905 are configured to communicate with each other, either uni-directionally or bi-directionally; and sensor data fusion and analysis module 825 can be integrated within either or both of apps 904 and 905.

Figure 9E:
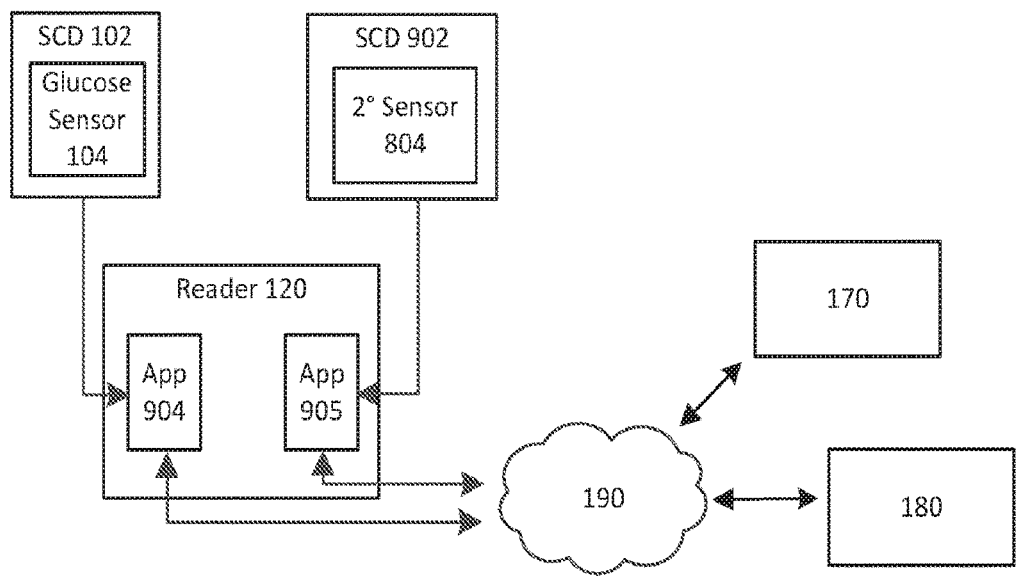

FIG. 9E depicts a system overview diagram showing a first sensor control device 102 having a glucose sensor 104 and a second sensor control device 902 having a secondary sensing element 804, wherein each sensor control device 102, 902 is configured to communicate with reader device 120. According to the embodiments shown in FIG. 9E, first sensor control device 102 is configured to transmit data indicative of a glucose level to app 904, which resides in non-transitory memory of reader device 120, and second sensor control device 902 is configured to transmit data indicative of a secondary physiological measurement to app 905, which also resides in non-transitory memory of reader device 120. According to another aspect of the embodiments depicted in FIG. 9E, each of app 904 and app 905 is configured to communicate, either uni-directionally or bi-directionally, via network 190, with one or both of local computer system 170 or trusted computer system 180. In some embodiments, network 190 can comprise a local area network, wide area network, metropolitan area network, virtual private network, cellular network, or the Internet. In some embodiments, trusted computer system 180 can comprise a cloud-based platform, server cluster, server farm, etc. According to another aspect of the embodiments depicted in FIG. 9E, sensor data fusion and analysis module 825 can reside, either partially or wholly, in non-transitory memory of one or more of app 904, app 905, local computer system 170, trusted computer system 180. According to one aspect of some embodiments, data from secondary sensing element 804 or information processed by 170 or 180 based on the fused data can be communicated to app 904 in order to provide adjustments to glucose sensor 104.

Example Methods for Improving Glucose Sensor Performance Using Secondary Sensor Data Example embodiments of methods for improving glucose sensor performance using secondary physiological measurements from a secondary sensing element will now be described. As with previous embodiments, it will be understood by those of skill in the art that any one or more of the steps of the example methods described herein can be stored as software instructions in a non-transitory memory of a sensor control device, a reader device, a remote computer, or a trusted computer system, such as those described with respect to FIG. 1. The stored instructions, when executed, can cause the processing circuitry of the associated device or computing system to perform any one or more of the steps of the example methods described herein. It will also be understood by those of skill in the art that, in many of the embodiments, any one or more of the method steps described herein can be performed using real-time or near real-time sensor data. In other embodiments, any one or more of the method steps can be performed retrospectively with respect to stored sensor data, including sensor data from prior sensor wears by the same user. For example, in some embodiments, the method steps described herein can be performed periodically, according to a predetermined schedule, and/or in batches of retrospective processes.

It will also be appreciated by those of skill in the art that the instructions can be stored in non-transitory memory on a single device (e.g., a sensor control device or a reader device) or, in the alternative, can be distributed across multiple discrete devices, which can be located in geographically dispersed locations (e.g., the cloud). For example, in some embodiments, the collection of data indicative of an analyte level (e.g., glucose, lactate), determination of suspected false glucose conditions and correlative physiological conditions, application of lag corrections and/or data smoothing, and the termination of the glucose sensor can all be performed solely on the sensor control device. In some embodiments, the determination of suspected false glucose conditions and correlative physiological conditions, application of lag corrections and/or data smoothing can be performed on a reader device, or by a trusted computer system. Likewise, those of skill in the art will recognize that the representations of computing devices in the embodiments disclosed herein, such as those shown in FIG. 1, are intended to cover both physical devices and virtual devices (or "virtual machines").

Generally, with a fixed extent of lag correction, such as assuming a fixed lag time constant in implementing a first order differential equation model of blood glucose to interstitial glucose lag, the extent of lag correction is a tradeoff between the positive effect of lag correction on the aggregate performance and the negative effect of too much lag correction in uncertain areas, such as with suspected false low glucose condition. According to one aspect of the embodiments, by using secondary physiological measurements, the certainty of specific glucose conditions, such as low glucose concentration, can be distinguished from falsely low glucose condition; and, the full extent of the glucose sensor fluctuation can be assumed to be physiological. As a result, it is possible and, consequently, more advantageous to exercise a more aggressive lag correction with the use of secondary physiological measurements than the extent determined solely by a tradeoff consideration.

By way of a non-limiting example, a tradeoff analysis may have concluded that a lag correction equivalent to compensating nine (9) minutes of lag is an optimal approach according to the aforementioned tradeoff. However, as the certainty of specific glucose conditions can be improved, a more aggressive lag correction equivalent to compensating twenty (20) minutes of lag may result in improved performance without increasing instances of false lag correction. For those of skill in the art, the determination of a more aggressive lag correction may involve a more complex model than the first order differential equation with more than one parameter, and do not necessarily imply increasing the values of all of the parameters in a lag correction model used.

Figure 10:
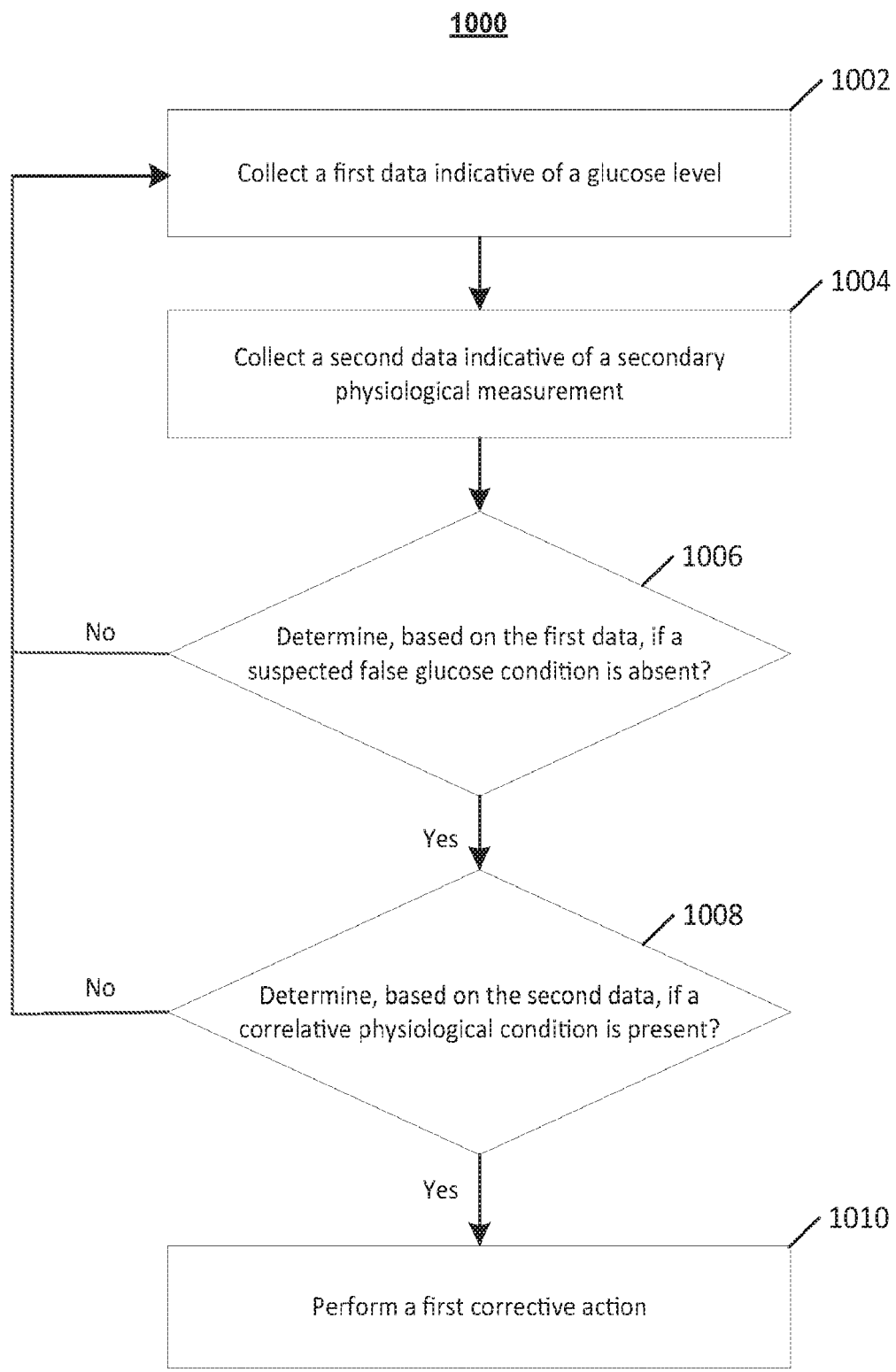
FIG. 10 is a flow diagram depicting an example embodiment of a method for improving the performance of a glucose sensor using secondary physiological measurements.

FIG. 10 is a flow diagram depicting an example embodiment of a method 1000 for improving the accuracy of glucose sensor data by using secondary physiological measurements. At Step 1002, a sensor control device including an analyte sensor, processing circuitry, and memory, collects a first data indicative of a glucose level. At Step 1004, a secondary sensing element collects a second data indicative of a secondary physiological measurement. As previously described with respect to FIGS. 9A-E, according to one aspect of the embodiments, the secondary sensing element can comprise one or more of a heart rate monitor, an insertable cardiac monitor, an implantable ECG device, or an implantable EEG device, and the second physiological measurement can be one or more of a heart rate, a QT interval, an ECG, or an EEG. According to some embodiments, the secondary sensing element can comprise one or more of a ketone sensor, a continuous ketone monitor, or a ketone strip sensor (e.g., as part of a reader device), and the second physiological measurement can be a ketone level.

At Step 1006, based on the first data, a determination is made as to whether a suspected false glucose condition is absent.

According to one aspect of the embodiments, a suspected false glucose condition can be a suspected false low glucose condition, such as a suspected false hypoglycemic condition. In some embodiments, the absence or presence of a suspected false low glucose condition can be ascertained by one or more tests using the first data, including but not limited to, determining if:

i) one or more glucose sensor data quality checks suggests a suspected false low glucose condition;
  ii) a glucose level is below a first predetermined low glucose threshold;
  iii) an area under the curve ("AUC") calculation (which can be based on a first recent predetermined time window with values below a second predetermined low glucose threshold) exceeds a predetermined low glucose AUC threshold;
  iv) a glucose percentile metric (e.g., from a second recent predetermined time window with values below a third predetermined low glucose threshold) exceeds a predetermined low glucose percentile threshold; or
  v) an average glucose level in a predetermined recent time window (e.g., a third recent predetermined time window) exceeds a third predetermined low glucose threshold.

According to another aspect of the embodiments, the suspected false glucose condition can be a suspected false high glucose condition, such as a suspected false hyperglycemic condition. In some embodiments, the absence or presence of a suspected false high glucose condition can be ascertained by one or more tests using the first data, including but not limited to, determining if:

i) one or more glucose sensor data quality checks suggests a suspected false high glucose condition;
ii) a glucose level is above a first predetermined high glucose threshold;
iii) an AUC calculation (which can be based on a fourth recent predetermined time window with values above a second predetermined high glucose threshold) exceeds a predetermined high glucose AUC threshold;
iv) a glucose percentile metric (e.g., from a fifth recent predetermined time window with values above a third predetermined high glucose threshold) exceeds a predetermined high glucose percentile threshold; or
v) an average glucose in a predetermined recent time window (e.g., a sixth recent predetermined time window) exceeds a third predetermined high glucose threshold.

Referring back to FIG. 10, at Step 1008, the second data (e.g., the secondary physiological measurement) is analyzed to determine if a correlative physiological condition is present. According to one aspect of the embodiments, the correlative physiological condition can be one of: an inferred absence of high glucose, an inferred presence of high glucose, an inferred absence of low glucose, or an inferred presence of low glucose. According to some embodiments, for example, the presence of a correlative physiological condition can be ascertained by comparing a sensed ketone level (e.g., using a continuous ketone monitor or a ketone strip reader) to a predetermined ketone threshold. A high ketone level that exceeds the predetermined ketone threshold can indicate an inferred absence of low glucose (or, conversely, the inferred presence of high glucose). Similarly, according to some embodiments, the presence of a correlative physiological condition can be ascertained by comparing a heart rate measurement (e.g., using a heart rate monitor) to a predetermined heart rate threshold. A high or increased heart rate that exceeds the predetermined heart rate threshold can indicate an inferred absence of high glucose (or, conversely, the inferred presence of low glucose).

According to one aspect of the embodiments, if it has been determined (from Step 1006) that a suspected false glucose condition (e.g., a suspected false low glucose condition, such as a suspected false hypoglycemia) is absent, and if it has been determined (from Step 1008) that a correlative physiological condition is present (e.g., a ketone level above a predetermined ketone threshold indicating an inferred absence of low glucose), then a first corrective action can be performed at Step 1010. In some embodiments, the first corrective action can comprise an aggressive lag correction. For example, according to some embodiments, a more aggressive lag correction can be applied when a seventh recent predetermined time window presents no conflicting information—for example, where: (1) an absence of a suspected low glucose condition is determined, and (2) the presence of a correlative physiological measurement is determined, wherein the correlative physiological measurement can be a ketone level above a predetermined ketone threshold indicating an inferred absence of low glucose.

It will be further understood by those of skill in the art that a suspected false glucose condition can be a suspected false high glucose condition (such as, e.g., suspected false hyperglycemia), and that the correlative physiological condition can be an inferred absence of high glucose (such as, e.g., a heart rate above a predetermined heart rate threshold).

Those of skill in the art will also understand that the step of determining the absence of a suspected false glucose condition (Step 1006) can include determining the absence of both a suspected false low glucose condition and a suspected false high glucose condition, and, furthermore, determining, based on the second data, if a correlative physiological condition is present for both absent suspected false glucose conditions (Step 1008).

According to another aspect of some embodiments, if it has been determined (from Step 1006) that a suspected false glucose condition is absent, but a correlative physiological condition is also absent, then a second corrective action (not shown) can be performed, wherein the second corrective action comprises one or more of a moderate lag correction or an increased glucose sensor signal smoothing.

In some embodiments, the step of determining if a correlative physiological condition is present (Step 1008) can also include determining a degree of correlation between the correlative physiological condition and the suspected false glucose condition. According to these embodiments, if the suspected false glucose condition is absent, but a correlative physiological condition is also absent, then a second corrective action (not shown) can be performed, wherein the second corrective action comprises one or both of a variable lag correction or a variable glucose sensor signal smoothing. According to another aspect of these embodiments, the variable lag correction can be a function of the degree of correlation between the correlative physiological condition and the suspected false glucose condition. Conversely, the variable glucose sensor signal smoothing can be an inverse function of the degree of correlation between the correlative physiological condition and the suspected false glucose condition. Those of skill in the art will also appreciate that other types of variable corrective actions (e.g., filtering, masking, etc.) can be performed, wherein the magnitude of the corrective action can be either a function or inverse function of the degree of correlation between the correlative physiological condition and the suspected false glucose condition.

In addition, according to some embodiments, a third corrective action comprising an early termination of the glucose sensor can be taken if it has been determined that there is an absence of a suspected false glucose condition (e.g., an absence of suspected false hypoglycemia), and a correlative physiological condition is present that suggests an inferred absence of low glucose (e.g., a high ketone level above a predetermined ketone level threshold).

Figure 11:
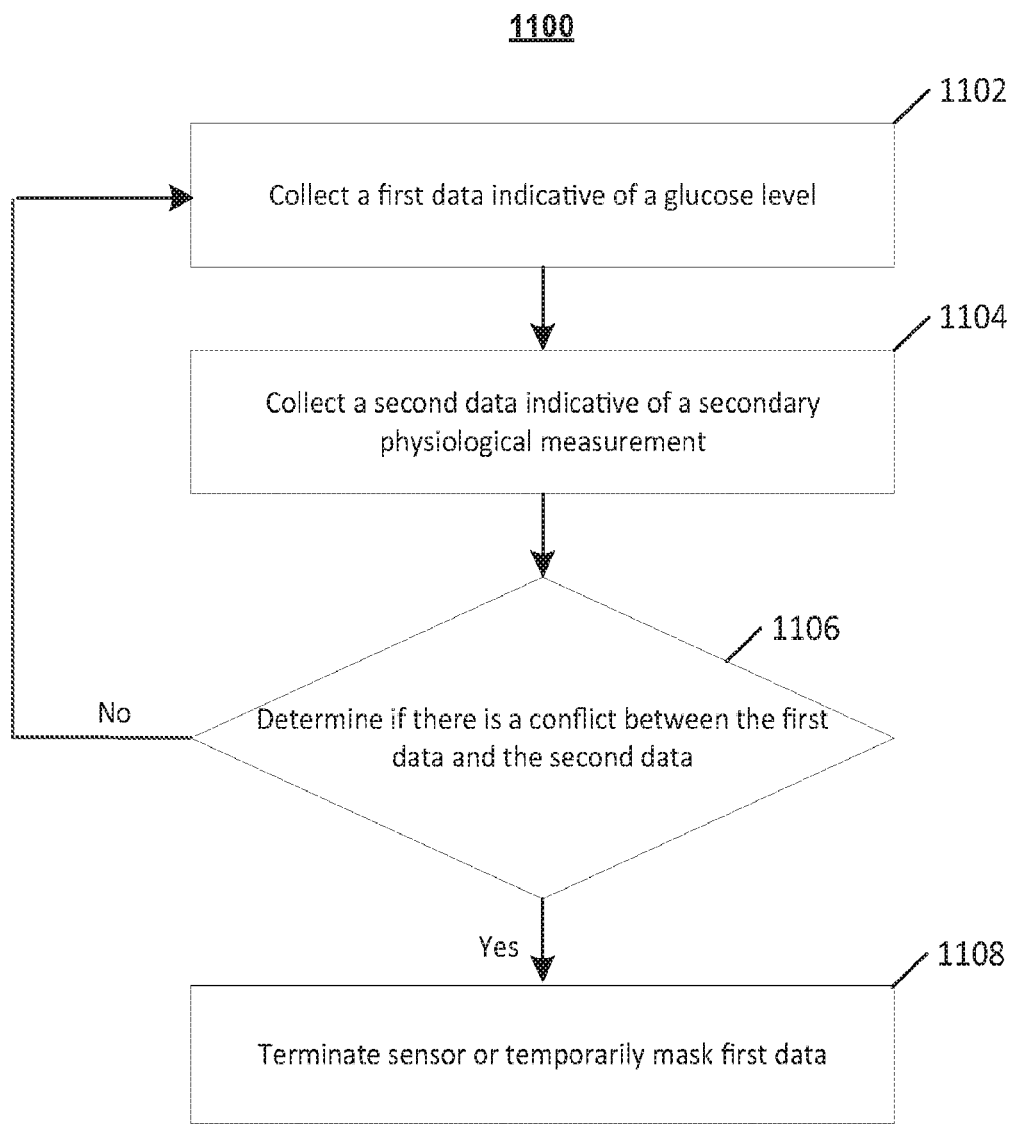
FIG. 11 is another flow diagram depicting an example embodiment of a method for improving the performance of a glucose sensor using secondary physiological measurements.

According to another aspect of some embodiments, the determination of a conflict between the first data indicative of the glucose level and the second data indicative of a secondary physiological measurement can be basis to take one or more corrective actions. FIG. 11 is a flow diagram depicting an example embodiment of a method 1100 for terminating a sensor or masking sensor data from a glucose sensor based on a detected conflict between glucose data and secondary physiological measurements. At Step 1102, a sensor control device including an analyte sensor, processing circuitry, and memory, collects a first data indicative of a glucose level. At Step 1104, a secondary sensing element collects a second data indicative of a secondary physiological measurement. As previously described, the secondary sensing element can comprise one or more of a heart rate monitor, an insertable cardiac monitor, an implantable ECG device, or an implantable EEG device, and the second physiological measurement can be one or more of a heart rate, a QT interval, an ECG, or an EEG. According to some embodiments, the secondary sensing element can comprise one or more of a ketone sensor, a continuous ketone monitor, or a ketone strip sensor (e.g., as part of a reader device), and the second physiological measurement can be a ketone level.

At Step 1106, a determination is made as to whether there is a conflict or disagreement between the first data and the second data. According to many of the embodiments, a conflict can be defined as a disagreement between, on the one hand, a glucose measurement that is suggestive of a high glucose condition, a low glucose condition, a suspected false high glucose condition, or a suspected false low glucose condition, and, on the other hand, a correlative physiological condition, such as an inferred high glucose condition (e.g., high ketone level) or an inferred low glucose condition (e.g, increased or high heart rate).

At Step 1108, if such a conflict has been detected, the glucose sensor can be terminated or, in the alternative, the sensor data can be discarded and/or temporarily masked. In addition, the termination of the glucose sensor or temporary masking of sensor data from the glucose sensor can further comprise causing a reader device, remote computing system, or trusted computer system to display a notification, alert, or alarm indicating that the sensor has been terminated or temporarily masking has occurred.

For each and every embodiment of a method disclosed herein, systems and devices capable of performing each of those embodiments are covered within the scope of the present disclosure. For example, embodiments of sensor control devices are disclosed and these devices can have one or more analyte sensors, analyte monitoring circuits (e.g., an analog circuit), memories (e.g., for storing instructions), power sources, communication circuits, transmitters, receivers, clocks, counters, times, temperature sensors, processors (e.g., for executing instructions) that can perform any and all method steps or facilitate the execution of any and all method steps. These sensor control device embodiments can be used and can be capable of use to implement those steps performed by a sensor control device from any and all of the methods described herein. Similarly, embodiments of reader devices are disclosed and these devices can have one or more memories (e.g., for storing instructions), power sources, communication circuits, transmitters, receivers, clocks, counters, times, and processors (e.g., for executing instructions) that can perform any and all method steps or facilitate the execution of any and all method steps. These reader device embodiments can be used and can be capable of use to implement those steps performed by a reader device from any and all of the methods described herein. Embodiments of computer devices and servers are disclosed and these devices can have one or more memories (e.g., for storing instructions), power sources, communication circuits, transmitters, receivers, clocks, counters, times, and processors (e.g., for executing instructions) that can perform any and all method steps or facilitate the execution of any and all method steps. These reader device embodiments can be used and can be capable of use to implement those steps performed by a reader device from any and all of the methods described herein.

Computer program instructions for carrying out operations in accordance with the described subject matter may be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages. The program instructions may execute entirely on the user's computing device, partly on the user's computing device, as a standalone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computer (for example, through the Internet using an Internet Service Provider).

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the foregoing description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art. Aspects are set out in independent claims 1, 21, 41, 56, 61, 76, 81, 102, 103 and 124 of the incorporated PCT Application No. PCT/US21/36094, filed Jun. 7, 2021 and the incorporated U.S. Provisional Patent Application No. 63/036,194. Preferred features are set out in the dependent claims and may be implemented in combination together with each of the aspects set out in the independent claims. Apparatus comprising means for implementing each of the methods are also provided.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. An analyte monitoring system, comprising:
a sensor control device including an analyte sensor, first processing circuitry, and a first non-transitory memory, wherein the analyte sensor includes at least a portion configured to be inserted into a user's body and collect a first data indicative of a glucose level;
a secondary sensing element configured to collect a second data indicative of a secondary physiological measurement; and
a reader device comprising second processing circuitry and a second non-transitory memory,
wherein at least one of the first or the second non-transitory memory includes instructions that, when executed, cause at least one of the first or the second processing circuitry to:
determine, based on the first data, if a suspected false glucose condition is absent, determine, based on the second data, if a correlative physiological condition is present, and
perform a first corrective action if the suspected false glucose condition is absent and the correlative physiological condition is present, wherein the first corrective action is an aggressive lag correction.

2. The analyte monitoring system of claim 1, wherein the secondary sensing element comprises one or more of a heart rate monitor, an insertable cardiac monitor, an implantable electrocardiogram (ECG) device, or an implantable electroencephalogram (EEG) device.

3. The analyte monitoring system of claim 1, wherein the secondary sensing element comprises one or more of a ketone sensor, a continuous ketone monitor, or a ketone strip reader.

4. The analyte monitoring system of claim 3, wherein the secondary physiological measurement comprises a ketone level.

5. The analyte monitoring system of claim 1, wherein the suspected false glucose condition is a suspected false high glucose condition or a suspected false low glucose condition.

6. The analyte monitoring system of claim 1, wherein the suspected false glucose condition is a suspected false low glucose condition, and wherein the instructions to determine the suspected false glucose condition comprise one or more of the following instructions to:
determine if one or more glucose sensor data quality checks indicate the suspected false low glucose condition;
determine if the glucose level, based on the first data, is below a first predetermined low glucose threshold;
determine if an Area Under the Curve (AUC) calculation, based on the first data and a second predetermined low glucose threshold, exceeds a predetermined low glucose AUC threshold;
determine if a glucose percentile metric exceeds a predetermined low glucose percentile threshold; or
determine if an average glucose level in a predetermined recent time window exceeds a third predetermined low glucose threshold.

7. The analyte monitoring system of claim 6, wherein the AUC calculation is based on the first data in a first recent predetermined time window, and wherein the glucose percentile metric is based on the first data in a second recent predetermined time window.

8. The analyte monitoring system of claim 1, wherein the suspected false glucose condition is a suspected false high glucose condition, and wherein the instructions to determine the suspected false glucose condition comprise instructions to:
determine if one or more glucose sensor data quality checks indicate the suspected false high glucose condition;
determine if the glucose level, based on the first data, is above a first predetermined high glucose threshold;
determine if an Area Under the Curve (AUC) calculation, based on the first data and a second predetermined high glucose threshold, exceeds a predetermined high glucose AUC threshold;
determine if a glucose percentile metric exceeds a predetermined high glucose percentile threshold; or
determine if an average glucose in a predetermined recent time window exceeds a third predetermined high glucose threshold.

9. The analyte monitoring system of claim 8, wherein the AUC calculation is based on the first data in a first recent predetermined time window, and wherein the glucose percentile metric is based on the first data in a second recent predetermined time window.

10. The analyte monitoring system of claim 1, wherein the correlative physiological condition comprises one of: an inferred absence of high glucose, an inferred presence of high glucose, an inferred absence of low glucose, or an inferred presence of low glucose.

11. The analyte monitoring system of claim 1, wherein the instructions to determine the correlative physiological condition comprise instructions to compare a ketone level to a predetermined ketone threshold.

12. The analyte monitoring system of claim 1, wherein the instructions to determine the correlative physiological condition comprise instructions to compare a heart rate measurement to a predetermined heart rate threshold.

13. The analyte monitoring system of claim 1, wherein the suspected false glucose condition is a suspected false low glucose condition and wherein the correlative physiological condition is an inferred absence of low glucose.

14. The analyte monitoring system of claim 1, wherein the suspected false glucose condition is a suspected false high glucose condition and wherein the correlative physiological condition is an inferred absence of high glucose.

15. The analyte monitoring system of claim 1, wherein the instructions, when executed, further cause the at least one of the first or the second processing circuitry to perform a second corrective action if the suspected false glucose is absent and the correlative physiological condition is absent, wherein the second corrective action comprises one or more of a moderate lag correction or an increased glucose sensor signal smoothing.

16. The analyte monitoring system of claim 1, wherein the instructions to determine if a correlative physiological condition is present further comprise instructions to determine a degree of correlation between the correlative physiological condition and the suspected false glucose condition.

17. The analyte monitoring system of claim 1, wherein the instructions are stored in the second non-transitory memory of the reader device,
wherein the instructions further comprise a first mobile app configured to receive the first data and a second mobile app configured to receive the second data, and
wherein one of the first mobile app or the second mobile is configured to determine the absence or the presence of the suspected false glucose condition and the correlative physiological condition and to perform the first corrective action.

18. The analyte monitoring system of claim 1, wherein the secondary sensing element comprises a lactate sensing element.

19. The analyte monitoring system of claim 18, wherein the secondary physiological measurement comprises a lactate level.

20. An analyte monitoring system, comprising:
a sensor control device including an analyte sensor, first processing circuitry, and a first non-transitory memory, wherein the analyte sensor includes at least a portion configured to be inserted into a user's body and collect a first data indicative of a glucose level;
a secondary sensing element configured to collect a second data indicative of a secondary physiological measurement; and
a reader device comprising second processing circuitry and a second non-transitory memory,
wherein at least one of the first or the second non-transitory memory includes instructions that, when executed, cause at least one of the first or the second processing circuitry to:
determine, based on the first data, if a suspected false glucose condition is absent,
determine, based on the second data, if a correlative physiological condition is present, wherein the instructions to determine if a correlative physiological condition is present further comprise instructions to determine a degree of correlation between the correlative physiological condition and any suspected false glucose condition,
perform a first corrective action if the suspected false glucose condition is absent and the correlative physiological condition is present,
perform a second corrective action if the suspected false glucose condition is absent and the correlative physiological condition is absent, wherein the second corrective action comprises a variable lag correction or a variable glucose sensor signal smoothing,
wherein the variable lag correction is a function of the degree of correlation between the correlative physiological condition and the suspected false glucose condition, and
wherein the variable glucose sensor signal smoothing is an inverse function of the degree of correlation between the correlative physiological condition and the suspected false glucose condition.

21. The analyte monitoring system of claim 20, wherein the secondary sensing element comprises a lactate sensing element and the secondary physiological measurement comprises a lactate level.

22. An analyte monitoring system, comprising:
a sensor control device including an analyte sensor, first processing circuitry, and a first non-transitory memory, wherein the analyte sensor includes at least a portion configured to be inserted into a user's body and collect a first data indicative of a glucose level;
a secondary sensing element configured to collect a second data indicative of a secondary physiological measurement; and
a reader device comprising second processing circuitry and a second non-transitory memory,
wherein at least one of the first or the second non-transitory memory includes instructions that, when executed, cause at least one of the first or the second processing circuitry to:
determine, based on the first data, if a suspected false glucose condition is absent, determine, based on the second data, if a correlative physiological condition is present,
perform a first corrective action if the suspected false glucose condition is absent and the correlative physiological condition is present, and
perform a second corrective action if the suspected false glucose is absent and the correlative physiological condition is absent, wherein the second corrective action comprises one or more of a moderate lag correction or an increased glucose sensor signal smoothing.

23. The analyte monitoring system of claim 22, wherein the secondary sensing element comprises one or more of a heart rate monitor, an insertable cardiac monitor, an implantable electrocardiogram (ECG) device, or an implantable electroencephalogram (EEG) device.

24. The analyte monitoring system of claim 22, wherein the secondary sensing element comprises one or more of a ketone sensor, a continuous ketone monitor, or a ketone strip reader.

25. The analyte monitoring system of claim 24, wherein the secondary physiological measurement comprises a ketone level.

26. The analyte monitoring system of claim 22, wherein the suspected false glucose condition is a suspected false high glucose condition or a suspected false low glucose condition.

27. The analyte monitoring system of claim 22, wherein the suspected false glucose condition is a suspected false low glucose condition, and wherein the instructions to determine the suspected false glucose condition comprise one or more of the following instructions to:
determine if one or more glucose sensor data quality checks indicate the suspected false low glucose condition;
determine if the glucose level, based on the first data, is below a first predetermined low glucose threshold;
determine if an Area Under the Curve (AUC) calculation, based on the first data and a second predetermined low glucose threshold, exceeds a predetermined low glucose AUC threshold;
determine if a glucose percentile metric exceeds a predetermined low glucose percentile threshold; or
determine if an average glucose level in a predetermined recent time window exceeds a third predetermined low glucose threshold.

28. The analyte monitoring system of claim 27, wherein the AUC calculation is based on the first data in a first recent predetermined time window, and wherein the glucose percentile metric is based on the first data in a second recent predetermined time window.

29. The analyte monitoring system of claim 22, wherein the suspected false glucose condition is a suspected false high glucose condition, and wherein the instructions to determine the suspected false glucose condition comprise instructions to:
determine if one or more glucose sensor data quality checks indicate the suspected false high glucose condition;
determine if the glucose level, based on the first data, is above a first predetermined high glucose threshold;
determine if an Area Under the Curve (AUC) calculation, based on the first data and a second predetermined high glucose threshold, exceeds a predetermined high glucose AUC threshold;

determine if a glucose percentile metric exceeds a predetermined high glucose percentile threshold; or determine if an average glucose in a predetermined recent time window exceeds a third predetermined high glucose threshold.

30. The analyte monitoring system of claim 29, wherein the AUC calculation is based on the first data in a first recent predetermined time window, and wherein the glucose percentile metric is based on the first data in a second recent predetermined time window.

31. The analyte monitoring system of claim 22, wherein the correlative physiological condition comprises one of: an inferred absence of high glucose, an inferred presence of high glucose, an inferred absence of low glucose, or an inferred presence of low glucose.

32. The analyte monitoring system of claim 22, wherein the instructions to determine the correlative physiological condition comprise instructions to compare a ketone level to a predetermined ketone threshold.

33. The analyte monitoring system of claim 22, wherein the instructions to determine the correlative physiological condition comprise instructions to compare a heart rate measurement to a predetermined heart rate threshold.

34. The analyte monitoring system of claim 22, wherein the suspected false glucose condition is a suspected false low glucose condition, wherein the correlative physiological condition is an inferred absence of low glucose, and wherein the first corrective action is an aggressive lag correction.

35. The analyte monitoring system of claim 22, wherein the suspected false glucose condition is a suspected false high glucose condition, wherein the correlative physiological condition is an inferred absence of high glucose, and wherein the first corrective action is an aggressive lag correction.

36. The analyte monitoring system of claim 22, wherein the first corrective action is an aggressive lag correction.

37. The analyte monitoring system of claim 22, wherein the instructions to determine if a correlative physiological condition is present further comprise instructions to determine a degree of correlation between the correlative physiological condition and the suspected false glucose condition.

38. The analyte monitoring system of claim 22, wherein the instructions are stored in the second non-transitory memory of the reader device, wherein the instructions further comprise a first mobile app configured to receive the first data and a second mobile app configured to receive the second data, and wherein one of the first mobile app or the second mobile is configured to determine the absence or the presence of the suspected false glucose condition and the correlative physiological condition and to perform the first corrective action.

39. The analyte monitoring system of claim 22, wherein the secondary sensing element comprises a lactate sensing element.

40. The analyte monitoring system of claim 39, wherein the secondary physiological measurement comprises a lactate level.

* * * * *